United States Patent
Iso-Sipilä et al.

(10) Patent No.: US 10,706,230 B2
(45) Date of Patent: Jul. 7, 2020

(54) SYSTEM AND METHOD FOR INPUTTING TEXT INTO ELECTRONIC DEVICES

(71) Applicant: TOUCHTYPE LIMITED, London (GB)

(72) Inventors: Juha Iso-Sipilä, London (GB); Hwasung Lee, London (GB); Julien Baley, London (GB); Joseph Osborne, London (GB)

(73) Assignee: TOUCHTYPE LIMITED, London (GB)

( * ) Notice: Subject to any disclaimer, the term of this patent is extended or adjusted under 35 U.S.C. 154(b) by 0 days.

(21) Appl. No.: 15/103,703

(22) PCT Filed: Dec. 11, 2014

(86) PCT No.: PCT/GB2014/053665
§ 371 (c)(1),
(2) Date: Jun. 10, 2016

(87) PCT Pub. No.: WO2015/087075
PCT Pub. Date: Jun. 18, 2015

(65) Prior Publication Data
US 2016/0321239 A1    Nov. 3, 2016

(30) Foreign Application Priority Data

Dec. 11, 2013 (GB) .................................. 1321927.4
Oct. 31, 2014 (GB) .................................. 1419489.8

(51) Int. Cl.
*G06F 17/00* (2019.01)
*G06F 40/274* (2020.01)
(Continued)

(52) U.S. Cl.
CPC .......... *G06F 40/274* (2020.01); *G06F 40/253* (2020.01); *G06F 40/268* (2020.01); *G06F 40/284* (2020.01)

(58) Field of Classification Search
CPC .. G06F 17/276; G06F 16/3344; G06F 40/289; G06F 40/20; G06F 40/274
(Continued)

(56) References Cited

U.S. PATENT DOCUMENTS 5,774,834 A * 6/1998 Visser ................... G06F 17/273
                                                        704/10
5,797,122 A    8/1998 Spies
(Continued)

FOREIGN PATENT DOCUMENTS

WO    WO 2003/034273 A1    4/2003
WO    WO 2010/112841 A1    10/2010
(Continued)

OTHER PUBLICATIONS

"Morpho Project"; http://www.cis.hut.fi/projects/morpho/; Laboratory of Computer and Information Science; Jul. 2015; accessed Aug. 1, 2016; 2 pages.
(Continued)

*Primary Examiner* — Andrew T McIntosh
(74) *Attorney, Agent, or Firm* — Schwegman Lundberg & Woessner, P.A.

(57) ABSTRACT

Systems for inputting text into an electronic device are provided. The systems are configured to receive a sequence of characters input into the device. The systems comprise a means configured to generate from the sequence of characters a sequence of word-segments. The systems also comprise a text prediction engine comprising a language model having stored sequences of word-segments. The text prediction engine is configured to receive the sequence of word-
(Continued)

segments. In a first embodiment, the text prediction engine is configured to determine whether each word-segment of the sequence of word-segments corresponds to a stored word-segment of the language model and output the sequence of word-segments as a candidate prediction when each of the word-segments of the sequence of word-segments corresponds to a stored word-segment of the language model, regardless of whether the sequence of word-segments corresponds to a stored sequence of word-segments. Various other systems and corresponding methods are provided. A system is provided comprising a word-segment language model comprising stored sequences of word segments and a candidate filter. The candidate filter is used to filter word predictions generated by the word-segment language model.

20 Claims, 16 Drawing Sheets

(51) Int. Cl.
    *G06F 40/253*     (2020.01)
    *G06F 40/268*     (2020.01)
    *G06F 40/284*     (2020.01)

(58) Field of Classification Search
    USPC .......................................................... 715/255
    See application file for complete search history.

(56) References Cited

U.S. PATENT DOCUMENTS

| | | | | |
|---|---|---|---|---|
| 9,367,526 | B1* | 6/2016 | Vozila | G06F 40/117 |
| 2003/0097252 | A1* | 5/2003 | Mackie | G06F 17/2755 |
| | | | | 704/9 |
| 2010/0235780 | A1* | 9/2010 | Westerman | G06F 16/322 |
| | | | | 715/797 |
| 2012/0029910 | A1* | 2/2012 | Medlock | G06F 3/0237 |
| | | | | 704/9 |
| 2012/0259615 | A1 | 10/2012 | Morin et al. | |
| 2016/0140956 | A1* | 5/2016 | Yu | G10L 15/16 |
| | | | | 704/240 |

FOREIGN PATENT DOCUMENTS

| | | |
|---|---|---|
| WO | WO 2012/090027 A1 | 7/2012 |
| WO | WO 2012/156686 A1 | 11/2012 |

OTHER PUBLICATIONS

"First Office Action and Search Report Issued in Chinese Patent Application No. 201480067442.6", dated Mar. 29, 2018, 26 Pages.
"International Search Report & Written Opinion Issued in PCT Application No. PCT/GB2014/053665", dated Apr. 14, 2015, 12 Pages.
"Office Action Issued in European Patent Application No. 14819054.9", dated Dec. 13, 2018, 11 Pages.
"Office Action Issued in Chinese Patent Application No. 201480067442.6", dated Nov. 23, 2018, 5 Pages.
"Summons to attend Oral Proceedings Issued in European Patent Application No. 14819054.9", dated Jul. 16, 2019, 14 Pages.
"Third Office Action Issued in Chinese Patent Application No. 201480067442.6", (w/ Concise Statement of Relevance), dated May 7, 2019, 15 Pages.
"Fourth Office Action Issued in Chinese Patent Application No. 201480067442.6", dated Nov. 13, 2019, (w/ English Translation), 33 Pages.

* cited by examiner

SYSTEM AND METHOD FOR INPUTTING TEXT INTO ELECTRONIC DEVICES

CROSS-REFERENCE TO RELATED APPLICATIONS

This application is a continuation of International Application No. PCT/GB2014/053665, filed on Dec. 11, 2014, which claims priority to Great Britain Patent Application Nos. 1419489.8, filed on Oct. 31, 2014, and 1321927.4, filed on Dec. 11, 2013, the disclosures of which are incorporated herein by reference in their entireties.

FIELD OF THE INVENTION

The present invention relates generally to a system and method for inputting text into electronic devices. In particular, the invention relates to a system comprising a text prediction engine having a language model for generating text predictions and a method for generating text predictions using such a system.

BACKGROUND

There are known systems which predict words on the basis of user inputted character sequences. One example of such a system is international patent application publication number WO2010/112841, titled "System and method for inputting text into electronic devices", which is hereby incorporated by reference in its entirety. WO2010/112841 describes a system comprising a text prediction engine configured to receive user inputted text and to generate one or more text predictions using a plurality of language models.

As described in that application, to enter a term which does not exist in the vocabulary of a language model, a user can insert the term by inputting it character-by-character into the user interface of the system. The term is then stored in a dynamic language model, such that the term can be predicted at a later time.

Although the verbatim text can be input by a user, if the verbatim text does not correspond to a known word of the language model, it will not be predicted as a candidate word with a corresponding associated probability.

A problem with many known systems is that the system autocorrects verbatim input when the verbatim input does not correspond to a word known to the language model of the system.

Autocorrecting verbatim input by replacing the verbatim input with alternative word suggestions known to the system can lead to a frustrating user text entry experience. The autocorrect function inputs the most likely candidate, for example when the user enters a space, unless the user specifically indicates that the predicted word (which is the alternative to the verbatim text) is not what they want to enter.

Known systems are limited to predicting known words only (i.e. words which are present in the language model of the system). A problem with such an approach is that the system is limited by the vocabulary seen in the training data, and can therefore never offer verbatim input as a prediction candidate if that verbatim input does not correspond to a word in the language model.

It is an object of the present invention to address one or more of the above identified problems.

SUMMARY OF THE INVENTION

The present invention provides systems in accordance with independent claims 1, 2, 3, and 44, methods in accordance with independent claims 27, 28, 29, 30, 43, and 50, and a computer program in accordance with independent claim 54.

Optional features of the invention are the subject of dependent claims.

With reference to claims 1 and 28, the term 'candidate prediction' is used to refer to a text prediction that is offered to the user for input into the system. The text prediction may correspond to a word or a combination of word-segments which is not known to the language model.

BRIEF DESCRIPTION OF THE DRAWINGS

FIG. 2a' is a schematic of the word-segment language model of FIG. 2a, further comprising a candidate filter;

DETAILED DESCRIPTION

Figure 1A:
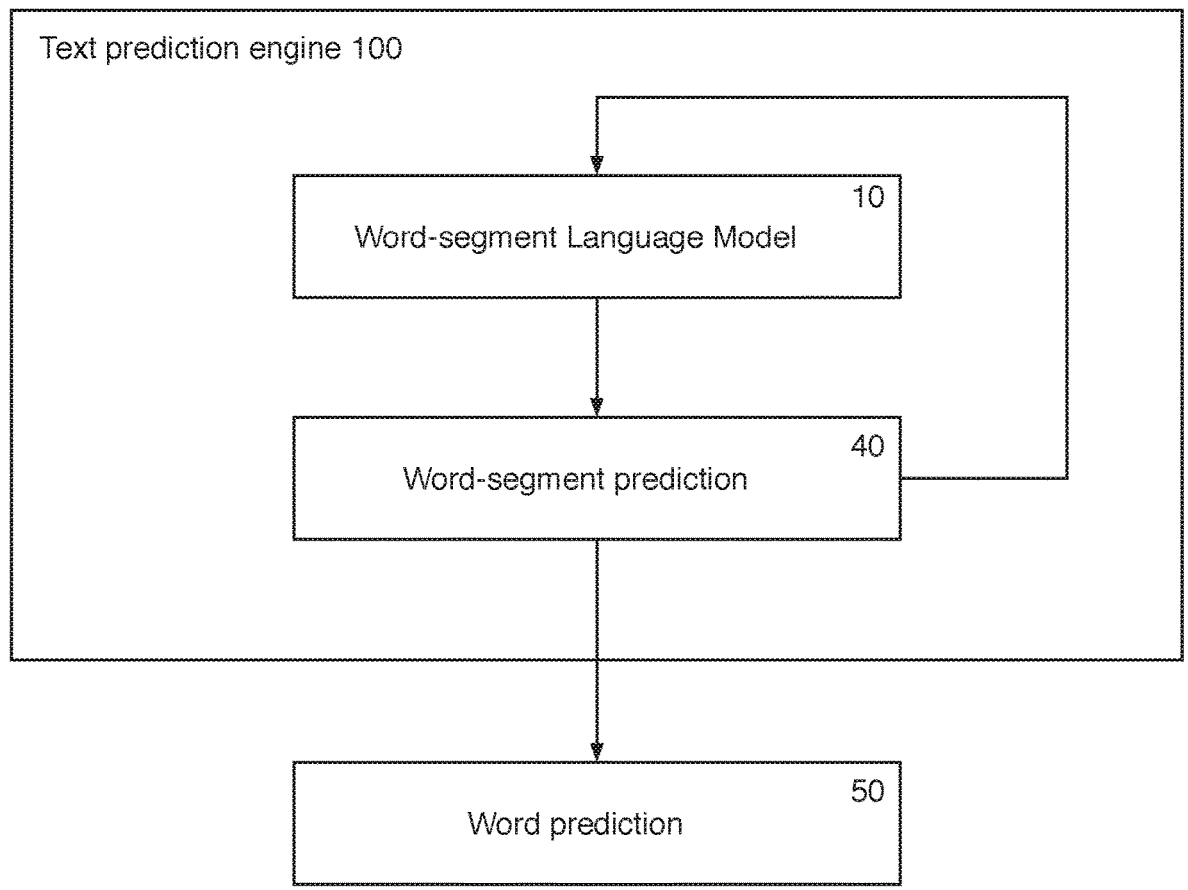
FIGS. 1a and 1b are schematics of high level prediction architectures according to the invention.
Figure 1B:
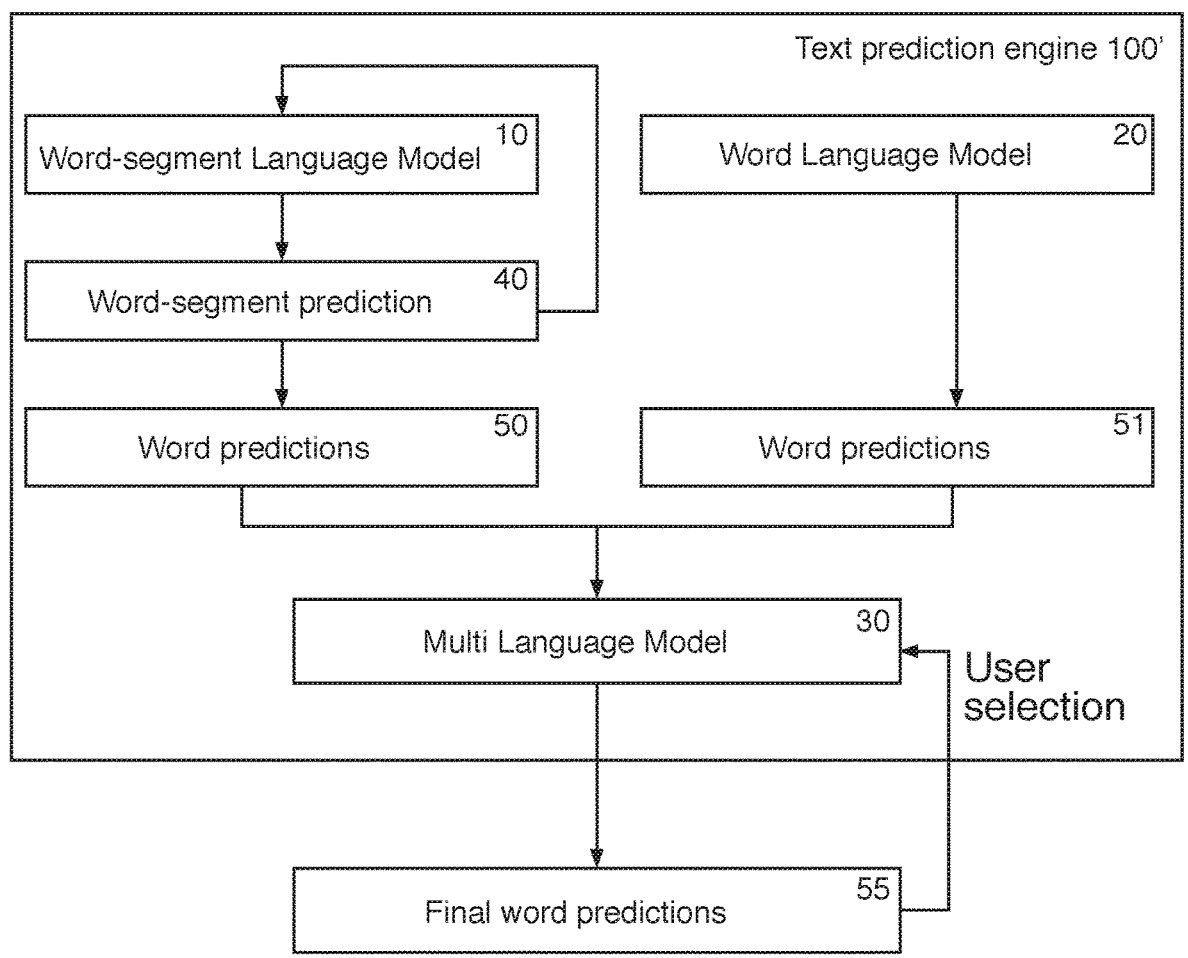

In general, but not exclusive terms, the system of the invention can be implemented as shown in FIGS. 1a and 1b.

FIG. 1a is a block diagram of a first system according to the invention. The system comprises a text prediction engine 100 that comprises a word-segment language model 10 which is configured to generate one or more word-segment predictions 40 from user inputted text. As will be described in greater detail below, the word-segment language model 10 can be configured to predict iteratively word-segments such that the output from the text prediction engine is one or more word predictions 50 which may be displayed on a user interface of an electronic device for user selection.

FIG. 1b is a block diagram of a second system according to the invention. The text prediction engine 100' of this embodiment has a word language model 20 in addition to the word-segment language model 10. The text prediction engine further comprises a multi-language model (Multi-LM) 30 to generate a final set of word predictions 55 from the word predictions 50, 50" outputted by the word-segment language model 10 and the word language model 20. The use of a Multi-LM 30 to combine word predictions sourced from a plurality of language models is described on line 1 of page 11 to line 2 of page 12 of WO 2010/112841, which is hereby incorporated by reference.

The high level prediction architecture of FIGS. 1a and 1b may include any number of additional language models, as described in WO 2010/112841. For example, the prediction architecture can comprise one or more of a general language model, an application specific language model, a user-specific (dynamic) language model, language models for different languages (e.g. Korean, Finnish, English, etc.), and any additional language models, any one or more of which may correspond to a word-segment language model 10 in accordance with the present invention.

A word segment is any part of a word that may be shared with other words in the language, for example the word segment 've' for the words 'vest', 'vesicle', 'vehicle', 'vegetable', have, positive, live, lively, lovely, etc. The word segments may include morphemes, since many words share affixes and suffixes, etc. However, word segments cover many more character combinations than morphemes, as they do not have to have a meaning associated with them. The word segment may be a character long, as with morphemes, for example 's' to pluralise a word, and may include words when there is no part of the word shared with other words. The term word-segment also covers word connectors, such as a possessive apostrophe, a hyphen etc., either alone or in combination with other characters.

A 'word-segment language model' 10 is a probability distribution representing the statistical probability of sequences of word-segments occurring within a natural language. A word-segment language model therefore comprises stored sequences of word-segments. Any given stored sequence may represent a word, a sequence of words or part of a word. In the present invention, the term 'word-segment language model' also encompasses a 'hybrid' language model, which comprises stored words or sequences of words, in addition to the stored sequences of word-segments, even if those words could be broken down into word-segments shared with other words. The words may be embedded in a sequence of word segments, may be provided on their own in the language model, or may be stored in a sequence of words. The words and the word-segments are preferably treated indiscriminately by the word-segment language model (i.e. the words are treated as word-segments).

A 'word language model' 20 is a probability distribution representing the statistical probability of sequences of words occurring within a natural language. A word language model, in the context of this application, stores sequences of full words only, i.e. there is no segmentation of the words.

There are certain disadvantages to using a language model that comprises word-segments only, since the word predictions from such a language model can be of lower accuracy for prediction of common words than a word language model. The "hybrid" language model approach benefits from the use of word-segments for predicting rare words (e.g. unknown combinations of known word-segments) whilst retaining the quality of prediction for common words.

There are a number of ways of identifying words which are best left un-segmented, for example the n most frequent words of a language can remain un-segmented. Alternatively, the choice of which words should remain un-segmented can be made based on the size of the word, since longer words have a higher chance of benefiting from being segmented, while shorter words will tend to be un-segment-able. The words may be identified by a combination of the two approaches, keeping words which are short and frequently used un-segmented. Any other suitable way of determining which words should remain un-segmented can also be used alone or in combination with the described approaches, dependent on the application of the prediction engine.

Selecting which words to keep as single units and which words to segment into word segments (e.g. morphemes) may depend on the morphological typology of the language. For some languages (e.g. English), it may be beneficial to retain a language model which mostly stores words and sequences of words, with some word-segment sequences; whilst for other languages it may be more beneficial to have a language model which mainly comprises word-segments and sequences of word-segments, with fewer words or word sequences.

Languages of the world are spread across a spectrum going from isolating languages (which means that morphemes are isolated from each other in different words) to agglutinative languages (where a word can contain lots of substrings each containing a unit of meaning). For example, in Mandarin (an isolating language) a person would not say "I printed" but "I print past"; no inflection of any sort, no conjugation/gender/tense/plural/case, etc. Whereas in Korean, which is an example of an agglutinative language, the verb carries the tense, the degree of politeness due to the interlocutor, the one due to the person talked about, expression of mood, etc. Likewise, Swahili verbs contain subject/tense/object/recipient/negation.

Agglutinative languages (including, for example, Korean, Finnish and Turkish), due to their compositional nature, have far more word forms and therefore would benefit most from the use of a word-segment language model. Most European languages appear somewhere in the middle range of the spectrum and benefit to "some extent" from word segmentation, whilst the relatively simple inflection system of English means that a predominately word based approach to modelling the language may be more appropriate.

To train a word-segment language model 10, the text corpus (or many corpora) is passed through a known technique for morpheme identification, e.g. an unsupervised compression-like technique provided in the Morfessor toolkit (http://www.cis.hut.fi/projects/morpho/). This technique identifies all morphemes in the text corpora and results in a dictionary that can be used to identify morphemes from words not actually seen in the text corpora (i.e. novel combinations of morphemes). This unsupervised technique uses minimum description length encoding to find the best set of morphemes that compresses the text corpora most efficiently. The best set of 'morphemes' may not therefore represent a set of true (in accordance with the grammatical meaning) morphemes. Alternative algorithms or techniques could also be used, e.g. supervised techniques. However, supervised techniques require annotated databases and there are no suitable morphological analysers or 'word-segmenters' that cover all the languages that may need to be supported.

Rather than determining the word-segments (e.g. morphemes) in a language using an unsupervised algorithm over a corpus of text, a pre-determined list of word-segments (e.g. morphemes) for a given language could be used. A supervised algorithm could be used to generate the language model probabilities from a corpus of text, where the vocabulary is already known in advance. Pre-determined morpheme vocabularies vary in quality and availability for different languages. The quality of such vocabularies can also be hard to assess which makes it difficult to know if a vocabulary is suitable, or to select the most appropriate one when multiple are available.

Figure 3:
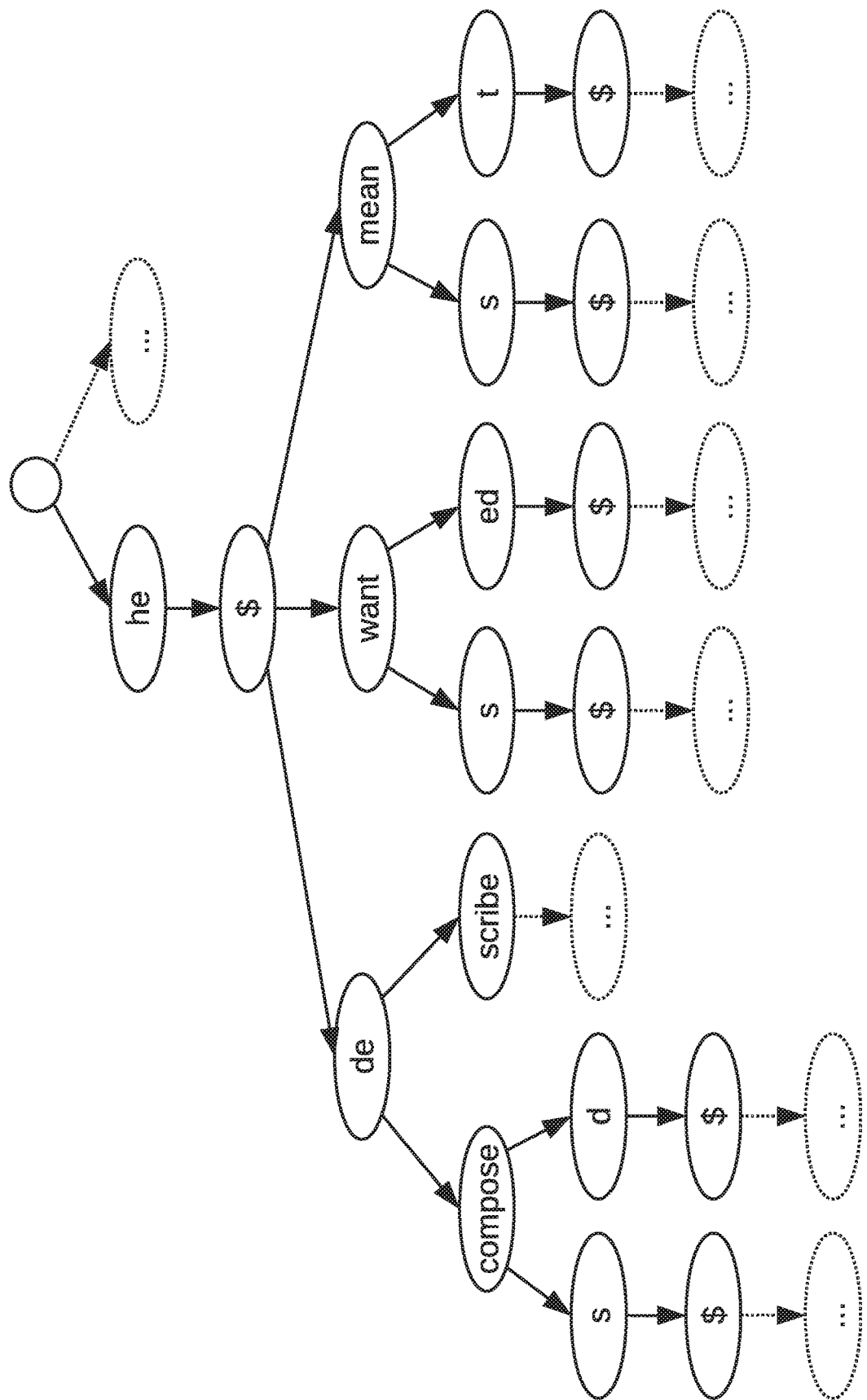
FIG. 3 is a schematic of a word-segment n-gram map according to the invention.

To train a word-segment language model 10, a large text corpora is passed through a morpheme dictionary (e.g. created by a supervised or unsupervised technique as described above) to split each divisible word into its word-segments (e.g. morphemes). Preferably, a word break symbol is also added (e.g. $) between every word (i.e. " " is mapped to "$" to distinguish between word segments and words. For example, the text "Welcome to weekend specials" might map to "Wel come $ to $ week end $ special s $". A new language model 10 may then be trained from the n-gram word-segment sequences (e.g. 6-gram) and includes the probability of the n-gram word-segment sequences occurring. An example of an n-gram map trained in such a way in illustrated FIG. 3 (where the probabilities associated with the word-segment sequences are omitted for simplicity).

As will be understood from the above-description of a word-segment language model 10, for the hybrid approach, the large text corpora is passed through the morpheme dictionary to split each word, which is not a word chosen to remain as a unit, into its word-segments (e.g. morphemes).

Figure 4:
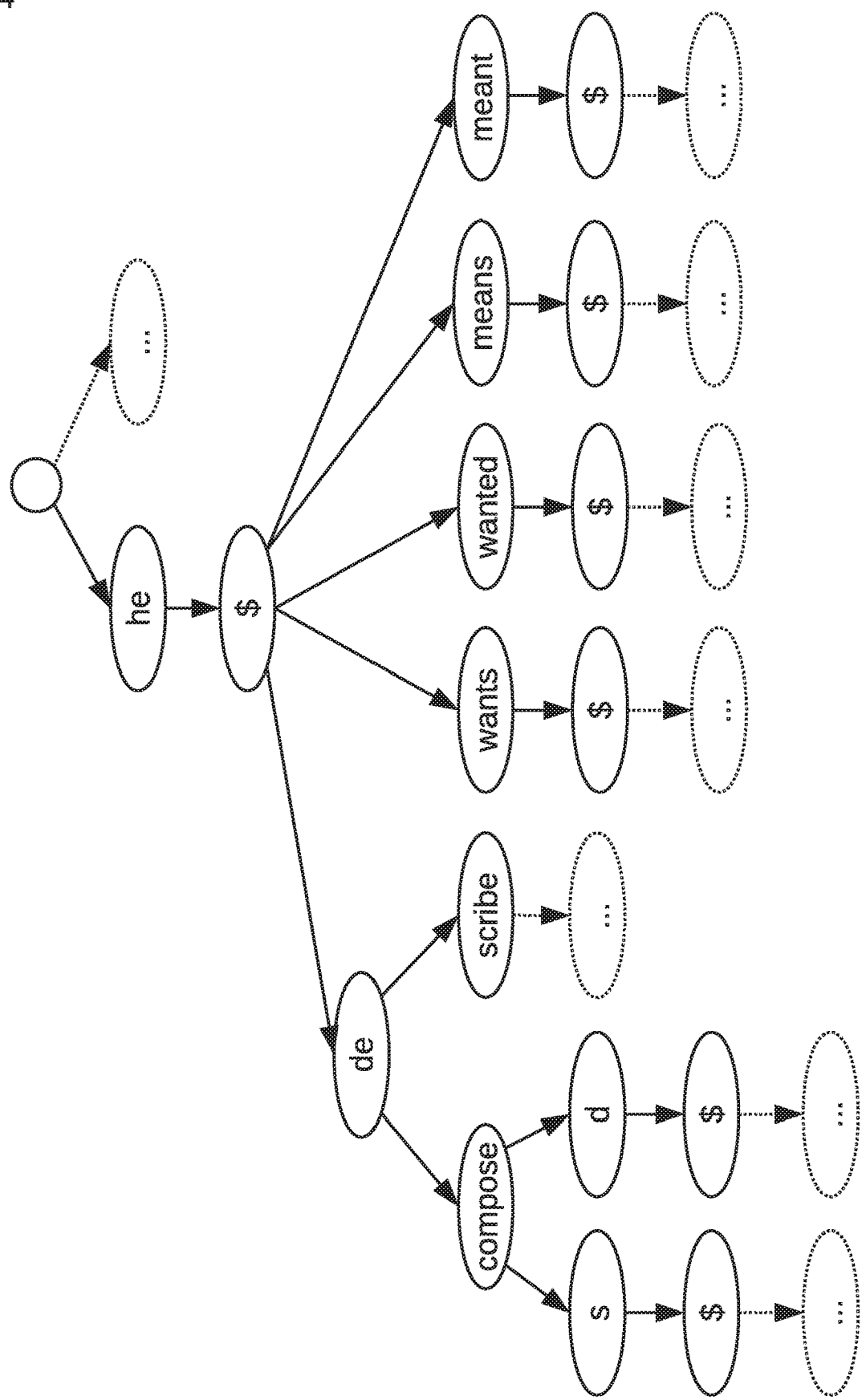
FIG. 4 is a schematic of a 'hybrid' word-segment n-gram map according to the invention.

For example, if 'weekend' was a word chosen to remain un-segmented, then the resultant n-gram word-segment and word based sequence would be "Wel come $ to $ weekend $ special s" for the above example. A new language model is then trained from the n-gram word-segment and word sequences (e.g. 6-gram) and includes the probability of the n-gram word-segment and word sequences occurring. An example of an n-gram map trained in such a way is illustrated in FIG. 4 (once again, the probabilities are omitted for simplicity). In contrast to FIG. 3, FIG. 4 comprises full words, which were segmented in FIG. 3, e.g. 'wants', 'wanted', 'means', 'meant'.

The generation of word-segment predictions 40, as well as word predictions 50, from a word-segment language model 10 is now described with reference to FIG. 2a, which is a simplified block diagram of the word-segment language model 10 of FIGS. 1a and 1b.

There are two inputs into a given language model, a current term input 11 and a context input 12. The current term input 11 comprises information the system has about the term the system is trying to predict, i.e. the term the user is attempting to enter and the context input relates to the preceding terms already input by a user.

For the word-segment language model 10 of FIG. 2a, the current term input 11 relates to any characters relating to the current word-segment that is being predicted, and the context input 12 relates to the previously inputted or predicted word-segments (as will be explained in more detail below), which relate to previously entered words as well as previously predicted/entered word-segments of the current word. The characters can be input by any suitable means which may include, for example, pressing individual buttons representing the characters or by a continuous gesture across a keyboard of a touchscreen user interface. The initial input may therefore correspond to a set of co-ordinates on a user interface which are converted to characters as described in detail in WO 2012/156686, which is hereby incorporated by reference in its entirety.

The language model of the present invention comprises an input language model, which takes as input the current term input 11, and a context language model which takes as input the context input 12.

In a preferred, but non-limiting embodiment, the input model is a trie 13 which is queried with the current word-segment input 11 to generate initial word-segment predictions from the word-segment input 11. As described in detail on line 4 of page 16 to line 14 of page 17 of WO 2010/112841, the trie 13 can be a standard trie (see FIG. 3 of WO 2010/112841) or an approximate trie (see FIG. 4a of WO 2010/112841) which is queried with the direct current word-segment input 11. Alternatively, the trie 13 can be a probabilistic trie which is queried with a KeyPressVector generated from the current input, as described in detail on line 16 of page 17 to line 16 of page 20 (and illustrated in FIGS. 4b and 4c) of WO 2010/112841, which is hereby incorporated by reference.

As described in WO 2010/112841, the KeyPressVector can take the form of an indexed series of probability distributions over character sequences. The KeyPressVector may comprise a probability distribution associated with each keystroke, to take into account errors in a user inputted keystroke, e.g. where the user pressed a 'k' when they intended to press 'l'. Furthermore, the KeyPressVector and input model can be used to correct for mistakes in the character entry of a word, in addition to the omission of punctuation marks. The KeyPressVector can also be configured to insert a repeated character which was omitted by the user if that character is found in the input model, to account for a missing character entry after each and every character inputted into a system, and can be configured to ignore a character entered by a user if that character is not in the input model.

In a preferred, but non-limiting, embodiment, the context model is an n-gram map 14. The context word-segments 12 are used to query a word-segment n-gram map 14, examples of which were described above with respect to FIGS. 3 and 4 to generate initial word-segment predictions from the context word-segments 12.

The system preferably comprises a final prediction mechanism 15 to generate a final set of predictions 40 from candidates (initial word-segment predictions) returned by the trie 13 and the word-segment n-gram map 14. The final prediction mechanism 15 may be the intersection mechanism as described in detail on line 21 of page 24 to line 7 of page 25 of WO 2010/112841, where the final prediction mechanism 15 is used to compute the intersection of candidates (initial word-segment predictions) returned by the trie 13 and the word-segment n-gram map 14 to generate one or more final word-segment predictions 40. However, as is described below, the final prediction mechanism 15 may take prediction candidates that are predicted by one of the trie and n-gram map, but not the other. The final prediction mechanism 15 differs in this respect from the intersection mechanism of WO 2010/112841.

Dependent on the use of the system, as will be described in more detail below, the prediction engine 100 may be configured to output for user selection the word-segment predictions 40. The term word-segment prediction 40 is intended to encompass word-segment correction/modification, as well as validation of a word-segment, in addition to prediction of a word-segment where there are characters in the word-segment which are unseen in the character sequence input by the user, as described in greater detail below. If word-segment predictions 40 are outputted to a user interface for user selection, the user interface functionality may need to be modified, for example not to insert spaces or replace the entire current word input where the predicted word-segments 40 correspond to a word-segment in the middle of a word, and not at the beginning/end.

In a preferred embodiment, the prediction engine 100 will output word predictions 50 because this is usually more intuitive for the user. In this preferred embodiment, word-segments 40 are iteratively predicted in order to generate a word prediction 50. Each time a word-segment has been predicted, the word-segment prediction 40 is fed into the language model 10 as a context word-segment 12, to generate the next word-segment in a sequence of word-segments which make up a word. The process of iteratively building up a word from word-segments continues until all of the current input has been consumed and a word boundary marker $ has been reached, denoting that a full word has been generated.

For example, if a user has inputted into an electronic device "I am translat", the context word-segment input is initially "I $ am $" and the current word-segment input 11 is taken from "translat".

The trie 13 comprises sequences of characters which, when queried with user input, returns one or more word-segment candidates. The trie may be of any suitable depth, comprising character sequences of length n. For example, if the trie has a depth of five (n=5), and the user is trying to enter the word 'translated' and has entered 'translat', the trie may be queried with the first five letters of the input, 'trans', and may return the word segments 'tra', 'tran' and trans'. The nodes of the trie which correspond to word-segment boundaries are identified in the trie, such that a query of the trie returns word segments that are substrings of longer word-segments.

The context evidence 12 is tokenised, for example using a tokeniser, into word segments (which in the case of "I am" is "I $ am $") and the language model 10 is configured to compare the sequence of word-segments ("I $ am $") with sequences of word-segments stored in the n-gram map 14, and return candidates for the next word-segment in the sequence. As there will be many instances where the exact same context needs to be tokenized (e.g. where the context is analysed on every character entered), the mapping of context to word-segments can be stored temporarily (e.g. as a cache in memory). This reduces the computing requirements and time associated with tokenization. The amount of data stored in the cache is a trade-off between efficiency during prediction and available memory.

The word-segments predicted by the n-gram map 14 will likely include words-segments which are not valid for the input word sequence, e.g. 'ali' as part of the stored sequence 'I $ am $ ali ve'. For sequences of word-segments which have many next word-segment predictions, the language model 10 may be configured to return the k most probable next word-segment predictions 40. To simplify the example, the 4 most probable candidates returned from the n-gram map could be, 'tran', 'ali', 'hun' and 'tired'.

Alternatively, the word-segment predictions are generated by the trie 13 and the intersection mechanism 15 searches for the word-segment predictions in the n-gram map 14 to determine whether there is an intersection (i.e. they would be predicted by both trie 13 and map 14) and therefore whether to output those word-segment predictions as final word-segment prediction 40.

The final prediction mechanism 15 is configured to generate a final set of predictions 40 from the prediction candidates generated by the trie 13 and the n-gram map 14. As discussed in detail in WO 2010/112841, the final prediction mechanism may be configured to compute the intersection of the two sets of candidates from the trie and the n-gram map, by retaining only the word segments that are present in both sets, which in this case would be 'tran'. In the situation where there is no context input, a beginning of word boundary marker "$" is the context for determining initial context. However, in a preferred embodiment, the final prediction mechanism 15 is configured to lower the probability (via a back-off approach as described below) of a candidate predicted by the trie if it has not been predicted by the n-gram map also (rather than retaining only candidates generated by both). In other words, there is no enforced context restriction (e.g. a bi-gram restriction) that the word-segments making up the word have to correspond to a known sequence of word-segments stored in the word-segment n-gram map 14. Thus, word-segment predictions that are generated on the basis on the current word input, using the trie, do not have to be found in the n-gram map 14 in a sequence with the other word-segment predictions.

The final prediction mechanism 15 is configured to combine the probabilities taken from the trie and the n-gram map. Thus, if the word segment has not been seen in that context before, but the word segment itself is known, the word-segment will be predicted with a probability of occurring, but this probability will be lower than the case where the word-segment is known and the word-segment is known in the context in which it is found.

In a preferred embodiment, if the word-segment has not been seen given the context, a 'back-off approach' is employed. For example, if a word-segment, $W_4$, is being predicted given the following context of word-segments $W_1 W_2 W_3$, and the n-gram map does not comprise a stored sequence corresponding to $W_1 W_2 W_3 W_4$, the language model will search for progressively shorter sequences, $W_2 W_3 W_4$, $W_3 W_4$ and then $W_4$ alone (if the language model comprises a unigram map), corresponding to a reduced context sequence. Each time the system has to back-off on the context searched for, the final prediction mechanism 15 applies a 'back-off' penalty to the probability (which may be a fixed penalty, e.g. by multiplying by a fixed value) of predicting $W_4$ given the context.

The set of word-segment predictions 40 returned from the final prediction mechanism 15 (e.g. 'tran') is then used as context to generate the next word-segment prediction 40, e.g. the n-gram map 14 will be queried with the following sequence of word-segments "I $ am $ tran", to generate predictions 40 for the next word-segment in the sequence of word-segments.

By iteratively generating word-segments, the language model 10 is able to provide the next word-segment in a sequence of word-segments, where there are characters in the word-segment which are unseen in the character input by the user, which in terms of the present example would relate to 'ing' which has not been entered by the user but is intended to be entered. If the final prediction mechanism 15 is configured to retain only word-segments that appear in both sets, it forces the word-segments to be word-segments that are known given the current input 11 and the context 12, i.e. sequences of word-segments which correspond to sequences stored in the n-gram map 14.

Following the same example, the language model 10 may have generated the following sequences of word-segments based on the character input sequence: "tran-slat". The n-gram word segment map may return "ing" and "or" by comparing the sequence "I $ am $ tran slat" with the stored sequences of word-segments in an n-gram map 14. For this example, there is no current input 11 for the final word-segment prediction, so the word segment predictions 40 are generated by comparison to stored sequences of word-segments in an n-gram map 14. If the input had been split differently, e.g. if the iterative word-segments predicted for 'translat' are V', 'ans' and 'la', 't' is the current word input 11 and the word-segment predictions 40 for the final word-segment will be based on word-segment predictions from the input 11 't' (using the trie) and the context 13 'tr ans la' (using the n-gram map).

Assuming a word boundary indicator "$" follows each of word-segment predictions 'ing' and 'or', the word predictions 50 output from the language model will be "translating $" and "translator $". Thus, the language model outputs a word prediction when all of the input has been consumed and a word boundary has been predicted. As will be apparent from the above example, the sequence of word-segments making up the word will have a greater number of characters than those input by a user, if the user has only partially entered a word, since the above process continues the word-segment iteration until a word boundary is reached.

As will be understood from the above, the word-segment language model 10 is configured to identify the multiple possible word-segment sequences in a given input evidence source 11, and to predict one or more additional word-segments 40 in order to predict one or more words 50 (which have been built-up from different word-segment sequences). For any given sequence of characters, the given sequence of characters can be split into multiple word-segment sequences.

For a word-segment language model 10 employing a KeyPressVector, the language model 10 is configured to be able to output sequences of word-segments in which the characters of a word-segment have been modified relative to the characters of the input character sequence. This is because the KeyPressVector takes into account that the input character sequence may not correspond to exactly what was intended by the user, i.e. where the user has made a mistake, whether intentionally, because they don't know the correct spelling, or unintentionally, e.g. by pressing the wrong key. Thus, the language model 10 is also configured to predict a modified or corrected word-segment from the input character sequence relating to the current word/word-segment being entered. Thus, if the user has misspelt a word, the language model 10 may also predict a word with fewer characters than the sequence of characters input by a user. For example, if the user types "hellno", the system will generate as a word prediction 50 "hello $". The KeyPressVector and trie 13 allow for the fact that the 'n' should have been an 'o' and the repeat 'o' should be ignored, or that the 'n' should be ignored in the sequence. The word boundary marker $ may be predicted form the trie, the n-gram map, or both. As discussed with reference to FIG. 2b below, "hell $ no $" can also be predicted from the system of the invention.

Each iteration of the prediction process may result in a number of word-segment prediction candidates 40 with different probabilities. This may result in a large number of possible word-segment sequences and hence a significant computational complexity to identify all candidate words 50 and their probabilities. Therefore, thresholds for minimum probability, number of iterations, number of word-segments, etc. can be employed for preventing such time consuming word completions. The threshold could be a static value (e.g. 4 iterations) or a dynamic value based on the size of the search tree or other parameters (which may include technical device capabilities, such as memory, processing power, storage available for download, etc.).

The above process can be extended to infer spaces (or other term boundary delimiters) in a sequence of characters entered by a user, where the user intends to input two or more words, but has (mistakenly or intentionally) missed the space between two inputted characters. FIG. 2b illustrates the language model of FIG. 2a with a couple of decision steps to illustrate how a word-segment language model 10b can be used to generate text predictions 50' comprising two or more words separated by one or more term boundaries, as well as single word predictions. Since the user character input for two or more terms will comprise more characters than a single word, the system is configured to first determine whether it has predicted the end of a word, i.e. whether a term boundary $ is predicted with the word-segment. If the language model 10b determines that a word boundary has not been reached (N), then the predicted word-segment is passed back into the language model as context input (along with any preceding word-segments). If the language model 10b determines that there is a word boundary (Y), then the language model 10b determines is has prediction a word 50. The language model 10b is configured to determine whether there is any more input. If there is no further inputted text (N), the predicted word 50 is output as a text prediction 50'. If there is further input (Y), the language model 10b predicts what word-segments 40 are likely to follow on from the predicted word 50, i.e. the predicted word 50 is passed back through the n-gram map 14 as context 12. The process iterates the word-segment prediction as described above until a word boundary is again reached and there is no further input. For example, if the user has input the characters 'homeco', the language model 10b of FIG. 2b will generate, amongst other predictions, 'homecoming' and 'home coming'. 'homecoming' will have been generated by the iterative process to generate a word 50, which is output when all of the input has been consumed and the language model has predicted a word boundary. 'home coming' will have been generated by the language model determining a word break before all of the input has been consumed, and thus using the predicted word ('home') 50 as context for the next word segment prediction. Thus, the text predictions 50' of FIG. 2b can comprise predictions of sequences of two or more words separated by one or more term boundaries, as well as single word predictions 50.

The word-segment language model 10 (described with reference to FIGS. 2a and 2b) may output invalid words (i.e. a combination of word-segments that does not occur in a language, but may occur in the sequence of word-segments of the n-gram word-segment map) by the above-disclosed process, because the process relies on the statistical likelihood of word-segment combinations, rather than a dictionary of words. This property of the system is preferable: Words in natural languages are comprised of morphemes, many of which are repeated in different words (e.g. common suffixes, stems, prefixes). Even in a very large text corpus (used as training data), valid combinations of morphemes may not be found, or may be of such low frequency that they are not included in a final vocabulary (e.g. due to memory constraints). This is particularly true of languages with large vocabularies, e.g. Finnish and Korean. The same is also true for languages where morphemes may differ in relation to nearby words (e.g. gender or plurality matching of nouns and adjectives in the Romance languages). However, it is possible to filter the word and text candidates 50, 50' using a candidate filter 60 to remove invalid words. For example, the candidate filter 60 could be configured to compare the candidate words 50 of FIG. 2a against a dictionary or words to discard invalid words, where the candidate filter outputs the filtered word predictions 50' (as shown in FIG. 2a').

In a preferred embodiment, the candidate filter 60 is a Bloom filter. The Bloom filter can be constructed using valid words, which can include constructing the Bloom filter using a sequence of characters for each valid word, a sequence of word-segments for each valid word, or a sequence of identifiers corresponding to the sequence of word-segments for each valid word. Each word-segment of the context map can each be provided with an identifier. Thus, when a word has been generated by the language model, the combination of identifiers corresponds to the combination of word-segments making up the word. By constructing a bloom filter using the combinations of identifiers for the valid words, the user inputted text can be more efficiently processed into the final filter word predictions.

The word candidates 50 outputted by the word-segment language model 10 can then be filtered by the Bloom filter 60, where any word candidates 50 not occurring in the Bloom filter 60 are discarded as invalid words.

An advantage of using a Bloom filter is that it is memory efficient, computationally efficient, and it will not return a false negative (a characteristic of Bloom filters). Thus, the Bloom filter 50 will never reject a word as invalid if it valid.

Figure 2A:
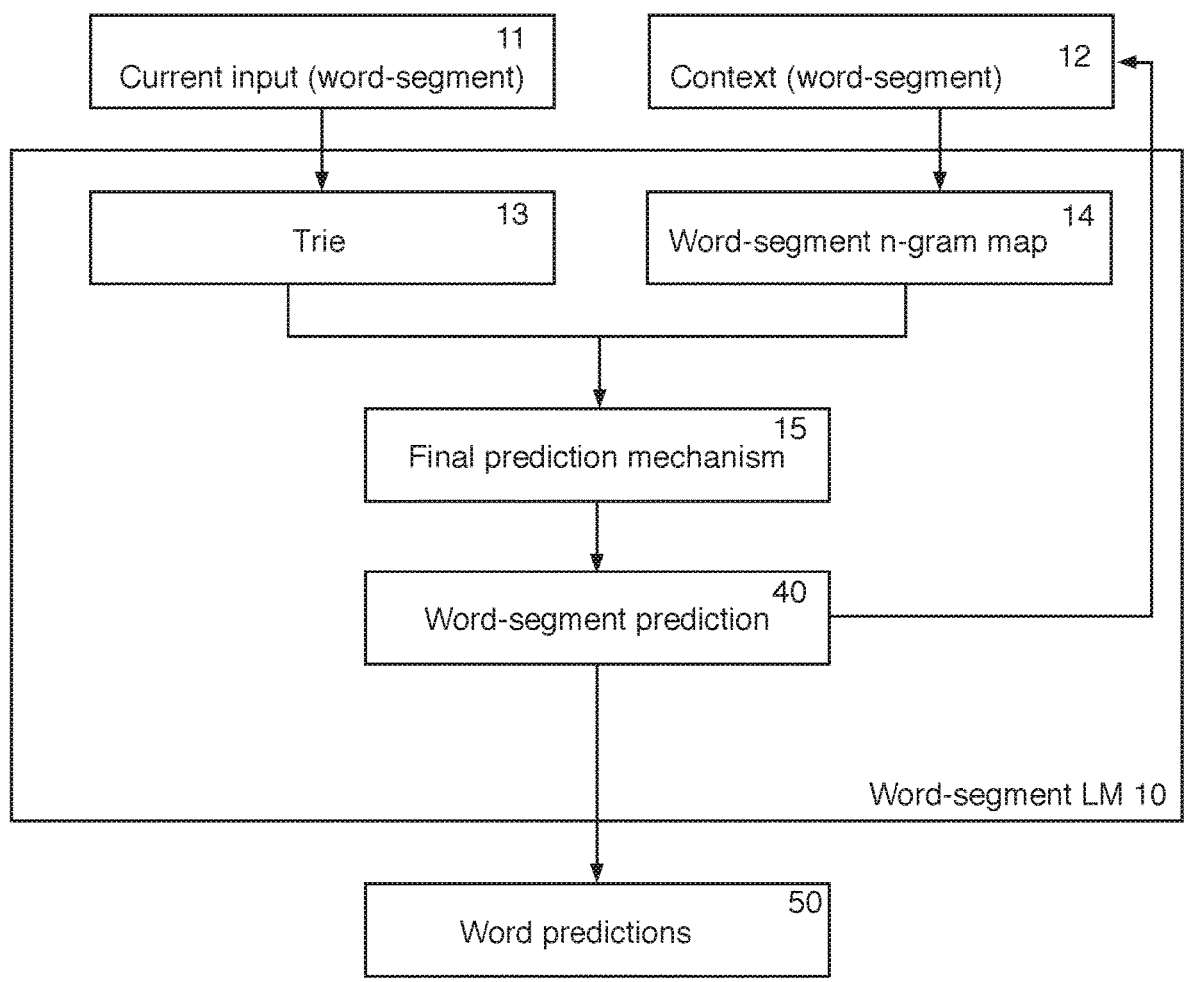
FIG. 2a is a schematic of a general word-segment language model of the prediction architecture according to the invention.
Figure 2A:
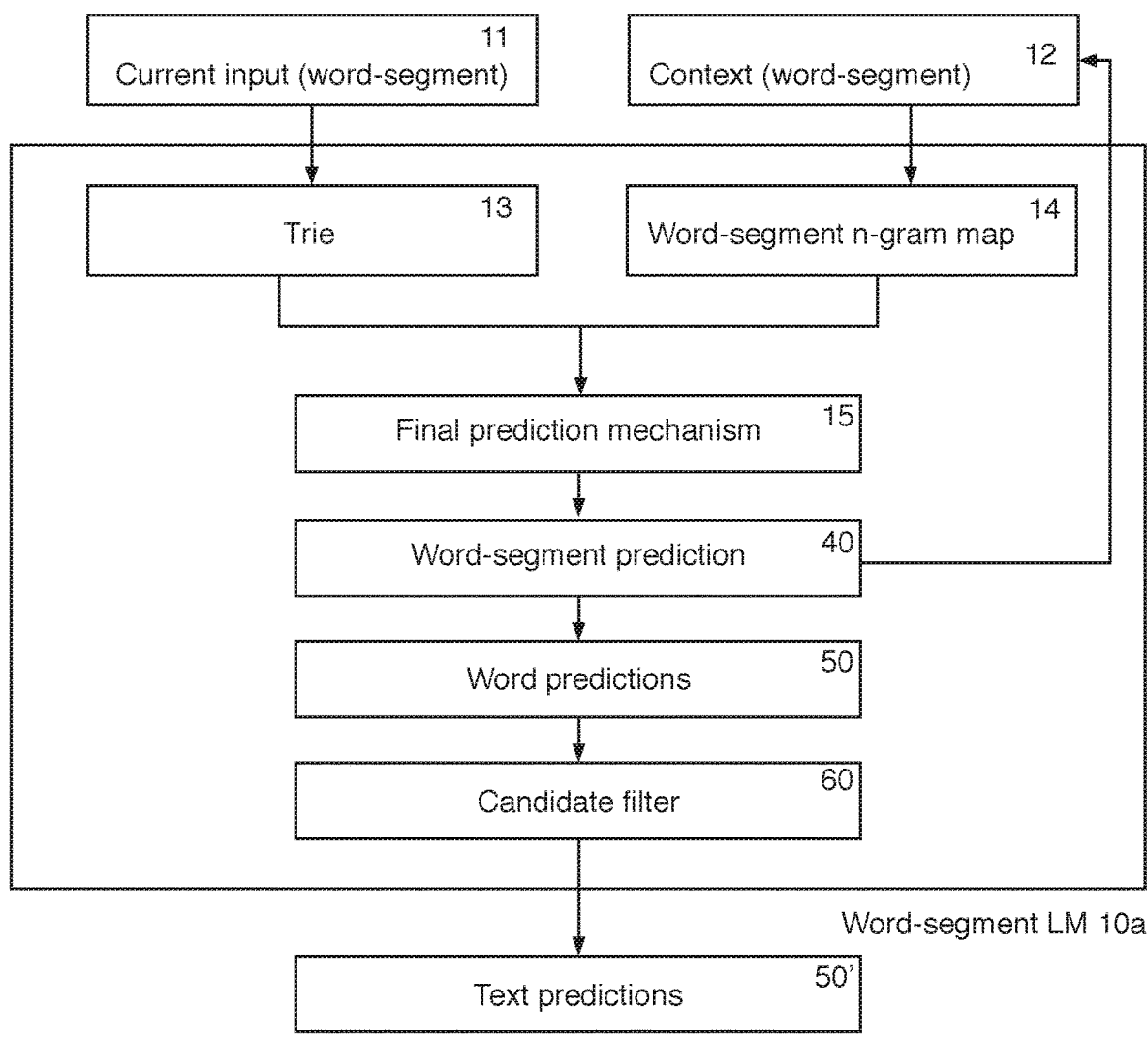
Figure 2B:
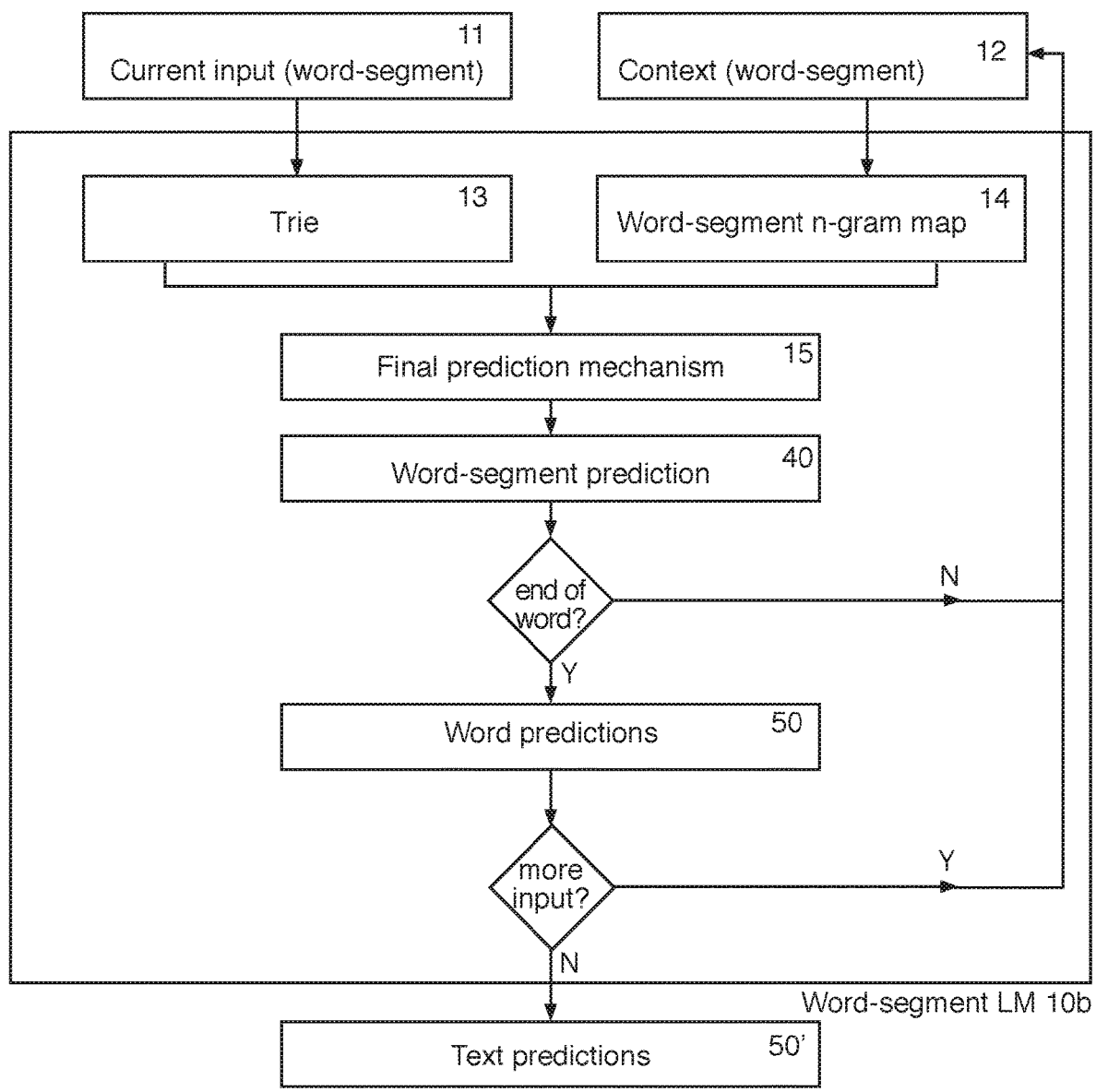
FIG. 2b is a schematic of a word-segment language model according to an embodiment of the invention.
Figure 2C:
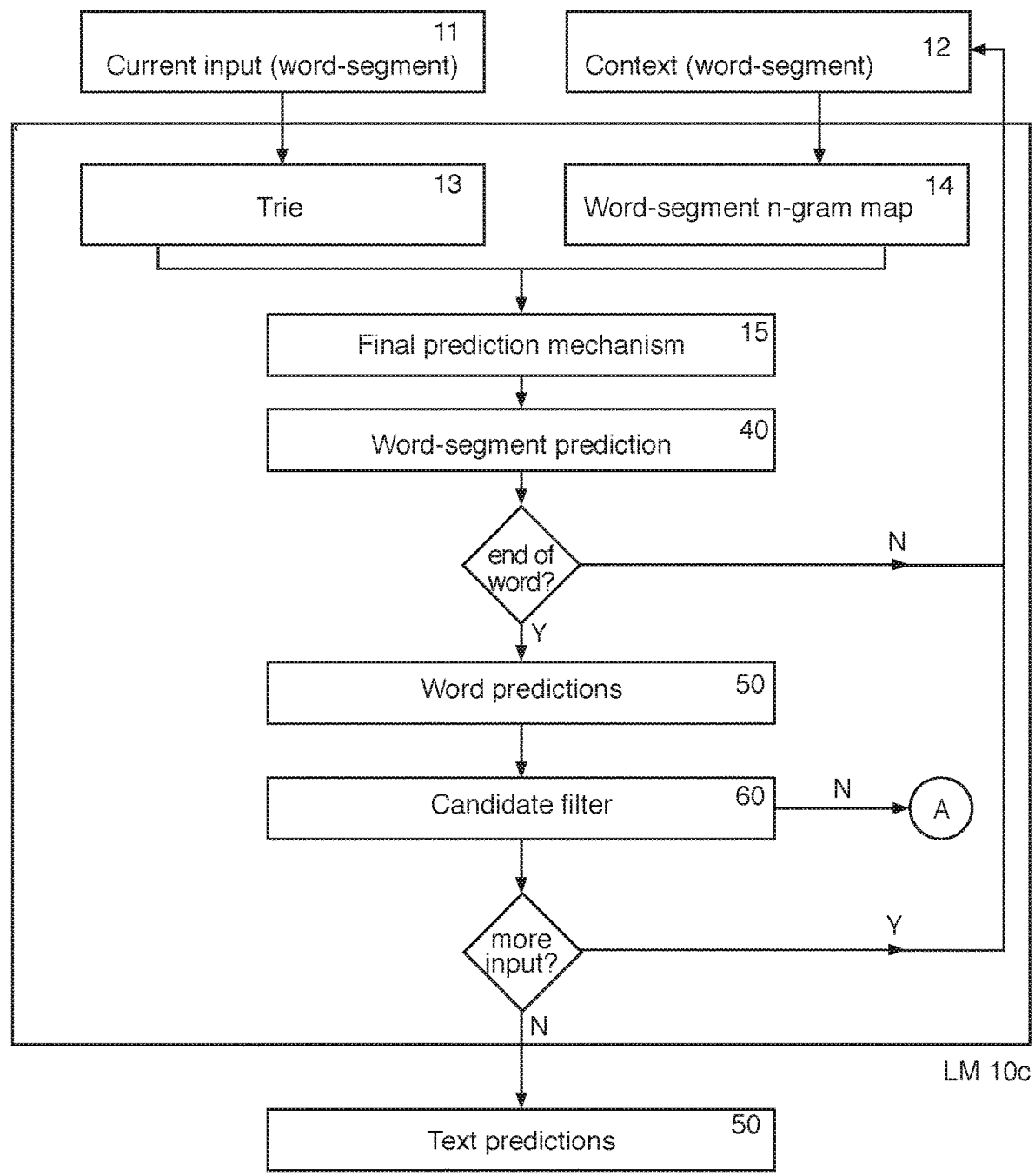
FIG. 2c is a schematic of a word-segment language model according to an embodiment of the invention.
Figure 2D:
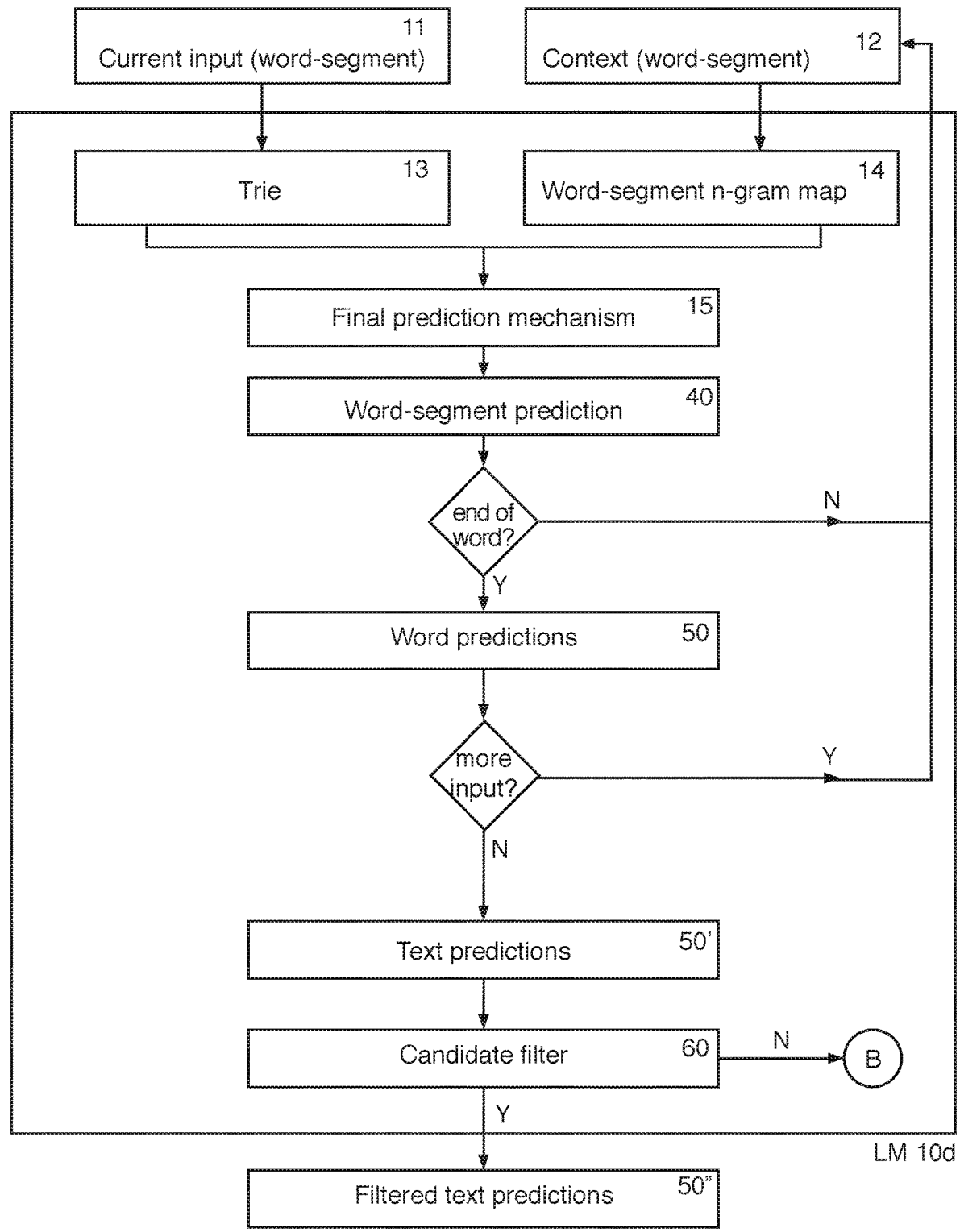
FIG. 2d is a schematic of a word-segment language model according to an embodiment of the invention.

FIGS. 2c and 2d illustrate two possible arrangements for a word-segment language model 10b, 10c comprising a candidate filter 60 for processing text predictions which may comprise two or more words with an inferred term boundary. The language models differ from that of FIG. 2b by the inclusion of a candidate filter 60 and differ from one another by the stage at which candidate words are passed through the candidate filter 60.

Referring to the embodiment of FIG. 2c, the language model 10c passes the word predictions 50 through the candidate filter 60. If the word is not a valid word (N), then the word is discarded or further processed at point A (as will be discussed later). If the word prediction 50 is determined to be a valid word (Y), then the language model determines whether there is any further input, as in the case of FIG. 2b. If there is further input left to consume, the valid word 50 is returned as context 12 for the word-segment n-gram map 14 to determine the next word-segment, i.e. the start of the next word. If there is no more input (N), the valid word 50 is output as a final word prediction 50'. By the above-described process, the paths for computing a sequence of words separated by one or more term boundaries is discarded, if the prediction word 50 is not a valid word of the candidate filter 50, stopping the processing of this path before its completion.

Referring to FIG. 2d, the language model is substantially the same as that shown for FIG. 2b, however, the text predictions 50' are passed through a candidate filter 60, which determines whether each word of the text predictions 50' is valid, e.g. whether each word of the sequence of two or more words is valid. If the word prediction or the words of a sequence of words are valid they are output as filtered text predictions 50". If a word is invalid or a word of a sequence of words is invalid, then the word or sequence of words is discarded or further processed at point B, as will be described later.

Although described as being part of the language model, the candidate filter 60 can be part of the text prediction engine 100 separate from the language model, where predictions to be filtered are passed from the language model to the filter, for example, as can be seen by FIGS. 2a' and 2d, where the filter can be considered separate from the language model 10a, 10d, without changing the structure or flow of data in the system.

The word-segment language models 10, 10b, 10c, 10d are preferably configured to generate a word prediction 50 which corresponds to verbatim user input, where that verbatim input does not correspond to a known word (i.e. a stored word or stored sequence of word-segments enclosed by word boundary markers, e.g. "$") of the word-segment language model 10.

To validate a word, the direct current input 11 (i.e., not via a KeyPressVector) is preferably used to search a trie 13. The word-segment language model 10 predicts iteratively the next word-segment in a sequence of word-segments as described above. In an alternative embodiment, it is possible to provide a prediction candidate that corresponds to a modified version of the verbatim input. In that instance, the trie will be a probabilistic trie which is used with a KeyPressVector to generate a plurality of possible word-segments from the user inputted character sequence, where the characters of the word-segment are not required to match directly those of the original user inputted text (e.g. the language model allows for user error in the input of the character sequence).

The final prediction mechanism 15 is configured to combine the probabilities taken from the trie and the n-gram map. Thus, if the word segment has not been seen in that context before, but the word segment itself is known, the word-segment will be predicted with a probability of occurring, but this probability will be lower than the case where the word-segment is known and the word-segment is known in the context in which it is found.

As described above, if the word-segment has not been seen given the context, a 'back-off approach' is employed (this back-off approach can also be employed for normal word-segment prediction as described above, but is most relevant for word-segment validation).

Since the language models 10, 10b, 10c, 10d validate the verbatim input as a word prediction 50, the language models 10, 10b, 10c, 10d are configured to determine the probability of the sequence of word-segments with a word boundary marker ("$") appearing at the end of the sequence.

In one embodiment, the validation of verbatim input may be carried out if the probability associated with a word prediction 50 generated by the word-segment language model 10, 10b, 10c, 10d (or a word language model 20, as will be described below) falls below a threshold value.

Thus, the word-segment language model 10, 10b, 10c, 10d predicts words 50 by the standard iterative process, unless the probability associated with the most likely word prediction 50 falls below a predetermined threshold. If the probability falls below this predetermined threshold, the word-segment language model 10, 10b, 10c, 10d is used to validate the verbatim text as a word prediction 50, as described above. The word-segment language model 10, 10b, 10c, 10d is configured to determine a confidence score, P(prediction)/P(validation). If the confidence score is larger than a pre-computed threshold, the language model outputs the word predictions 50 generated by the initial process (where, preferably, the final prediction mechanism 15 retains only predicted word-segments generated by both the trie and the n-gram map 14). If the confidence value is less than the pre-computed threshold, the verbatim input is output (with or without word predictions 50 generated by the first process). The threshold is preferably computed from a set of sample data with target performance figures.

In alternative embodiments, the prediction engine may be configured to carry out validation of the verbatim text for every user inputted text entry. The above ratio comparison is then carried out for the top k prediction candidates. The ratio values determine whether the verbatim text is offered as a prediction candidate (by itself or along with other prediction candidates).

Referring to FIGS. 2b, 2c and 2d, if the verbatim input is retained in the word predictions 50 as described above, the verbatim input will appear in the text predictions 50', either as a word prediction or a word prediction of a sequence of word predictions with an inferred term boundary.

For the case of FIGS. 2a', 2c and 2d, since the verbatim input is not a known word, it will likely be filtered out as invalid by the candidate filter. Thus, at the candidate filter of FIG. 2a' or at step A of FIG. 2c, the language model is preferably configured to determine whether or not the invalid word prediction 50 (i.e. the word predictions discarded by the candidate filter 60) corresponds to verbatim input (for example by tagging or identifying the word prediction 50 associated with verbatim input). If the invalid word prediction does not correspond to the verbatim input it is discarded. However, if the word prediction 50 corresponds to verbatim input it is retained. Referring to FIG. 2c, if there is no further input to process, the verbatim input is output as a text prediction 50', along with the valid text predictions that have passed through the candidate filter 60 processing step. If there is further input to process, that word prediction 50 relating to verbatim input can be used as context 12 to generate the next word-segment, resulting in (after the iterative process) a sequence prediction comprising the verbatim word prediction, one or more word predictions and an inferred space. This sequence prediction is output as a text prediction 50', assuming the sequence has a high enough associated probability to be retained).

Referring to FIG. 2d, the text predictions 50' are filtered by the candidate filter 60. Where the text predictions 50' comprise a predicted sequence two or more terms separate by an inferred term boundary, the sequence is discarded at step B, if one or more of the words of the sequence is invalid when passed through the candidate filter. However, if the predicted sequence is determined to comprise the verbatim input, then this predicted sequence is output as a filtered text prediction 50", rather than being discarded (assuming it has a high enough associated probability to be retained).

Another advantage of using a bloom filter for the candidate filter 60, is that it is possible for the text prediction engine to update the Bloom filter 60 of the language model with predicted words which relate to verbatim text input, for example, after being selected for input by a user. In the above systems, the top text predictions 50' may be outputted to a display for user review and selection. If a user selects for input the word prediction 50' comprising the verbatim text, this word can be used to update the Bloom filter. In subsequence input of this word, the word will then pass through the filter, without being discarded by the filter in FIG. 2a' and without proceeding to step A or B of FIGS. 2c and 2d. Although described with respect to the Bloom filter, any candidate filter capable of being updated can be used.

By providing a language model 10, 10b, 10c, 10d that can predict the verbatim text as the 'word' that the user wishes to enter, the system does not automatically correct the verbatim text to a known word of the language model, thereby providing more accurate word predictions 50 for input into the system (either automatically or via user selection).

The format of the word-segment language model can match the format of a word language model, which allows a text predicting engine to use both types of language model, as illustrated in the system FIG. 1b. In the system of FIG. 1b, the prediction engine 100' preferably comprises a multi-language model 30 (Multi-LM) to combine word predictions 50 sourced from the word-segment language model 10 of FIG. 2a and the word predictions 51 sourced from the word language model 20 of FIG. 2e, to generate final predictions 55 that may be provided to a user interface for display and user selection (or the most-likely prediction may simply be inserted). The final predictions 55 may comprise a set (i.e. a specified number) of the overall most probable predictions. The Multi-LM 30 generates the final predictions 55 by inserting the predictions 50, 51 from each language model 10, 20 into an ordered associative structure, as described in detail on line 1 of page 11 to line 2 of page 12 of WO 2010/112841, which is hereby incorporated by reference. The word predictions 50, 50" may be generated concurrently, or the word predictions 50 from the word-segment language-model 10 may be generated after the word predictions 51' have been generated from the word language-model 20 (or vice versa). Although described as comprising the word-segment language model of FIG. 2a, the word-segment language model can be that described with reference to FIG. 2a', 2b, 2c or 2d.

The word-segment language model 10 can therefore be used in conjunction with the word language model 20 to enhance the probability of a word prediction 50 relating to the verbatim text and hence reduce unwanted correction.

If desired, the word-segment language model 10 need only be used to validate the verbatim text, with other word predictions/corrections being supplied by the word language model 20. This may be advantageous because it is more complex to tokenize input text into word-segments (as it uses a statistical algorithm), as opposed to a word-based tokenizer which, in many languages, simply identifies word separators (e.g. " "). If used to validate verbatim text only, the language model is preferably that of FIG. 2a or FIG. 2b, since the candidate filter is not required.

For such a use of the system of FIG. 1b, word predictions 51 (which may include correction candidates) are output from the word language model 20. If the word predictions 51 output from the word language model 20 fall below a certain threshold, the probability of the verbatim word is determined using the word-segment language model 10 as described in detail above. The probability for the verbatim text (i.e. probability for word prediction 50 where the word prediction 50 is the verbatim text) from the word-segment language model 10 can then be merged with the probability in the prediction candidates 51 (where it may or may not exist if the verbatim text is not contained within the word language model 20). As described above, this may result in the most likely word prediction 55 being the word prediction 50 which corresponds to the verbatim input, rather than the alternative 'corrected' word prediction 51.

Alternatively, the prediction engine 100' can source word predictions 50, 51 from both language models 10, 20 simultaneously and apply a scaling factor between the two models, to increase the probabilities associated with word predictions from one of the models. The verbatim validation step may therefore be carried out by the word-segment language model 10 for each piece of user inputted text.

A system comprising a word-based language model 20 and a word-segment language model 10, 10b, 10c, 10d has certain advantages over a system having a word-segment language model only 10, 10b, 10c, 10d, dependent on the use of the system. For example, the word-based language model 20 may be a dynamic language model which is trained on user inputted text. If the device comprising the system has restricted storage requirements, a word-based dynamic language model is preferable to a word-segment dynamic language model 10, 10b, 10c, 10d, because a word-segment dynamic language model would require the system to include a mechanism to segment the user inputted text, e.g.

a Morfessor toolkit, in order to train the language model. Furthermore, there may be language models focussed on certain subjects which would lose accuracy if they were trained as a word-segment language model, for example, language models based on names of people and places etc.

By combining a word-segment language model 10, 10b, 10c, 10d with a word language model 20, it is possible to validate verbatim text using the word-segment language model 10 since it comprises an increased word vocabulary due to the combination of word-parts, whilst also avoiding the decrease in prediction accuracy due to the number of word-segment n-grams needed to replicate word-based context (since the word language model 20 can be used for all but validation of verbatim text).

The computational complexity for word-segment language model 10, 10b, 10c, 10d prediction may be higher than that for a word language model 20, because it may be necessary to search more paths for a given context, which might make it advantageous in some circumstances to generate word predictions from a word-based language model and use the word-segment language model for validation only.

It is most advantageous to combine a word language model 20 with the word-segment language model 10, when the word-segment language model 10 is composed of word-segments without words, i.e. the non-hybrid approach. The hybrid approach to creating a word-segment language model 10 overcomes many of the problems associated with a purely word-segment language model 10, reducing or obviating the need for combining it with a word language model 20. Furthermore, the hybrid approach obviates the requirement to combine predictions sourced from two different language models, where it may be difficult to combine predictions from the language models because they take different evidence (i.e. words as context rather than word-segments), which may result in different probability scales. Furthermore, a hybrid language model may be more efficient with respect to storage than a system comprising multiple language models.

Figure 2E:
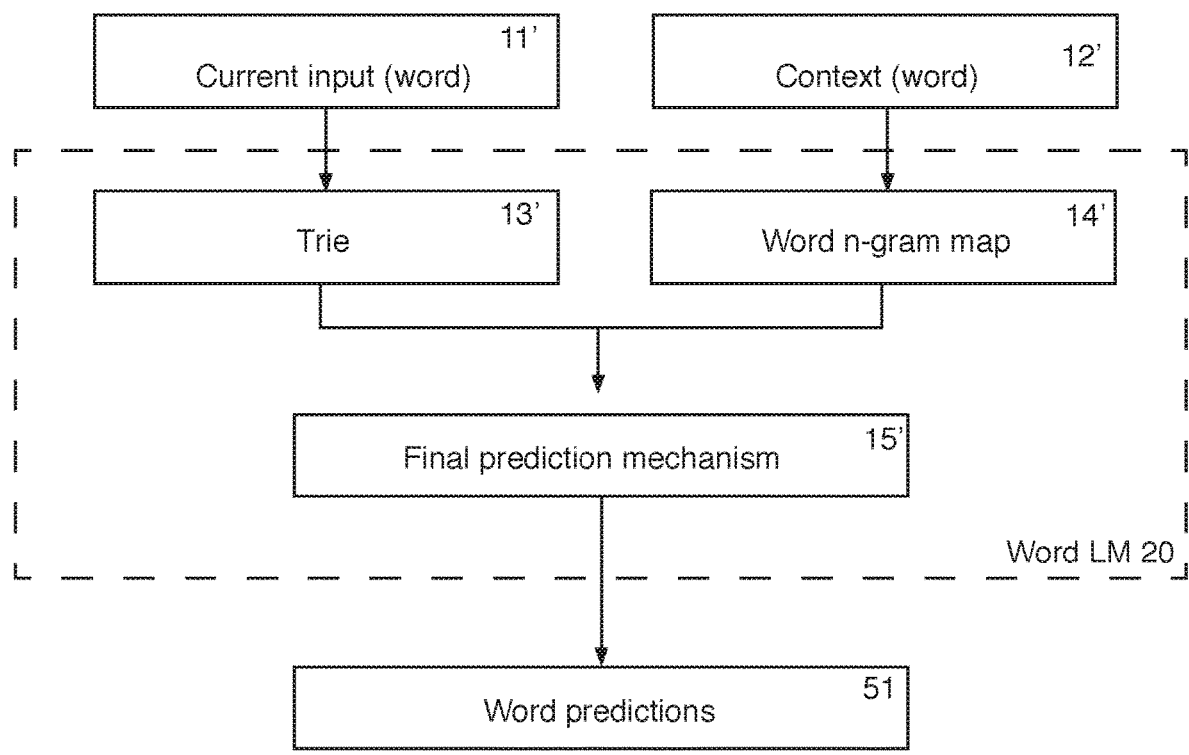
FIG. 2e is a schematic of a general word-based language model of the prediction architecture according to the invention.

Referring to FIG. 2e, the word language model 20 has the same format as the word-segment language model 10 of FIG. 2a. The current input 11 for the word language model 20 is the character(s) relating to the current word the user is entering. The context 12 for the word language model 20 is the inputted text preceding the current word input, tokenised into words.

Referring back to FIG. 1b, the Multi-LM 30 may tokenise inputted text into word segments and also words which it passes to the word-segment language model 10 and the word language model 20 respectively. Alternatively, a tokeniser separate to the Multi-LM 30 may be employed (not illustrated).

As shown in FIG. 2e, the word language model 20 comprises a trie 13' (which may be a standard trie, an approximate trie or a probabilistic trie), a word n-gram map 14', and a final prediction mechanism 15' for generating word predictions 50'. The trie 13', word n-gram map 14' and intersection mechanism 15' may be as discussed in WO 2010/112841. Furthermore, the final prediction mechanism 15' may correspond to the intersection mechanism as described in WO 2010/112841.

As explained in detail above, the word-segment language model 10 of the present invention can be used by the prediction engine 100, 100' for various tasks. As discussed with reference to FIG. 1a, the word-segment language model 10 can be used as a replacement for a normal word-based language model for generating word-segment predictions 40 and/or word predictions 50. However, the word-segment language model 10 can also be used in conjunction with a word language model 20, and be called upon to validate verbatim text, as described in relation to FIG. 2a.

By using a word-segment language 10 model for word prediction, the whole language can be expressed with fewer word-segments than words, which enables smaller language models or allows access to the entire set of words of a language (which may be too large otherwise), particularly useful for languages which have a very large lexicon (Korean, Finnish, Germanic languages etc). Furthermore, the word-segment language model also results in the prediction of a valid combination of known word-segments, where that combination of word-segments has not appeared in the data used to train the language model(s).

A word-segment based language model 10 would provide the same size vocabulary as a word based language model with less memory/storage. Thus, for the same size memory capacity, the word-segment based language model 10 can provide an increased vocabulary over a word based language model 20.

The above advantages may result in increased accuracy of predictions, because of the increased vocabulary and word combinations.

Methods of the present invention will now be described with reference to FIGS. 5-10 which are schematic flow charts of methods according to the invention.

Figure 5:
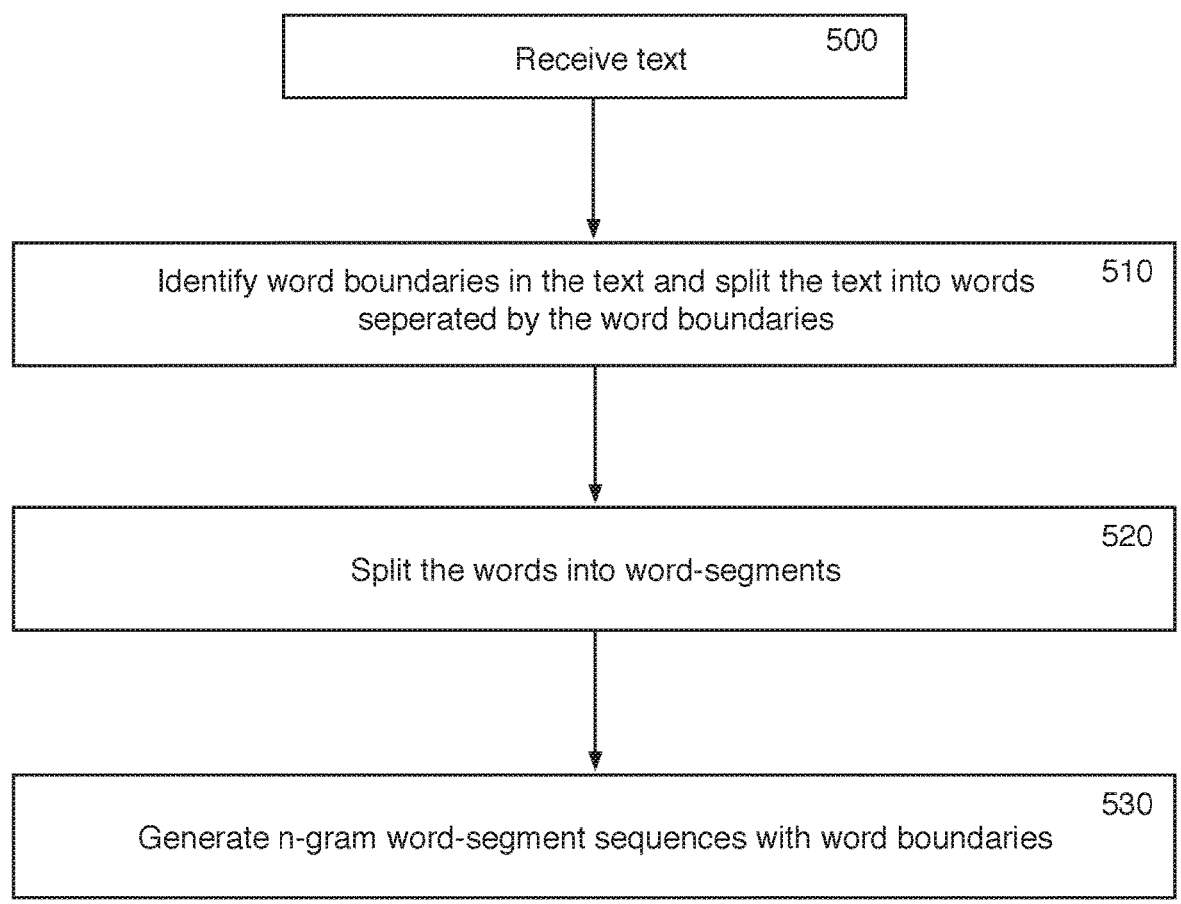
FIG. 5 is a flow chart of a method of generating a word-segment language model according to the invention.

With reference to FIG. 5, the present invention provides a method of generating a word-segment language model, which in the context of the present invention may mean generating a static language model from source text or building up a dynamic user language model from user entered text. The method comprises receiving text 500, which text may be source text or user entered text, identifying word boundaries in the text to split the text into words separated by the word boundaries 510 (e.g. using a tokeniser to separate the text into words, by identifying space characters), and splitting the words into word-segments 520 (e.g. using the Morfessor toolkit). The method further comprises generating n-gram word-segment sequences with word boundaries 530.

Figure 6:
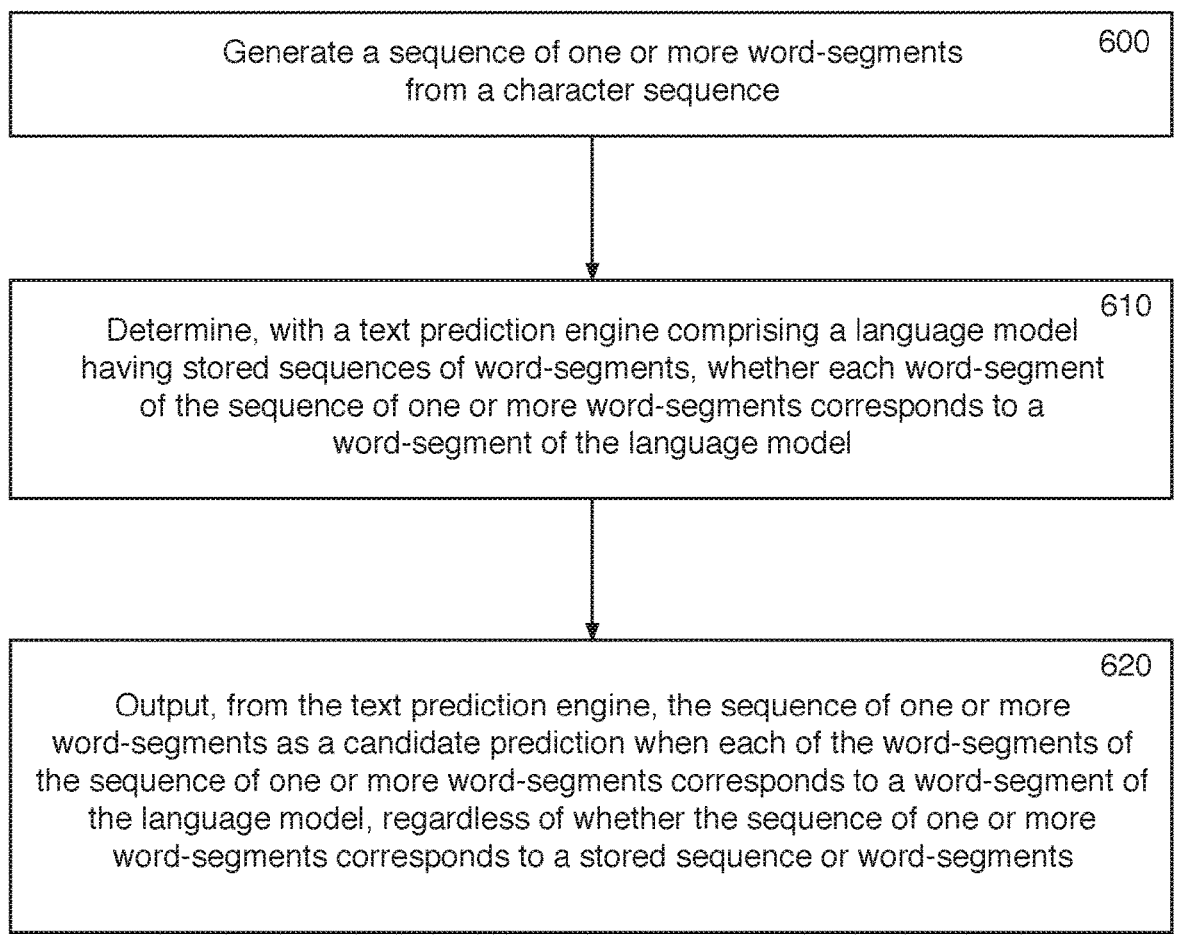
FIG. 6 is a flow chart of a first method of processing an electronic character sequence according to the invention.

FIG. 6 illustrates a first method of processing text according to the invention. In particular, the method is for validating verbatim input as a 'word' prediction, when that input 'word' is not a recognised word of the word language model 20 or a known combination of word-segments of the word-segment language model 10, as described above in relation to the systems illustrated in FIGS. 1a and 1b. The method comprises generating a sequence of one or more word-segments from the character sequence 600. This word-segment sequence is preferably generated by iteratively predicting word-segments, as described above. The method further comprises determining whether each word-segment of the sequence of one or more word-segments corresponds to a word-segment of a language model that has stored sequences of word-segments 610.

The method further comprises outputting the sequence of one or more word-segments as a candidate prediction (i.e. a word to be entered by the user) when each of the word-segments of the sequence of one or more word-segments corresponds to a word-segment of the language model, regardless of whether the sequence of one or more word-segments corresponds to a stored sequence of word-segments 620. This method is therefore able to generate a 'word' prediction relating to verbatim text, which can be output to a user, preventing the autocorrection of verbatim text. The details of the method steps are as described above in relation to the system.

Figure 7:
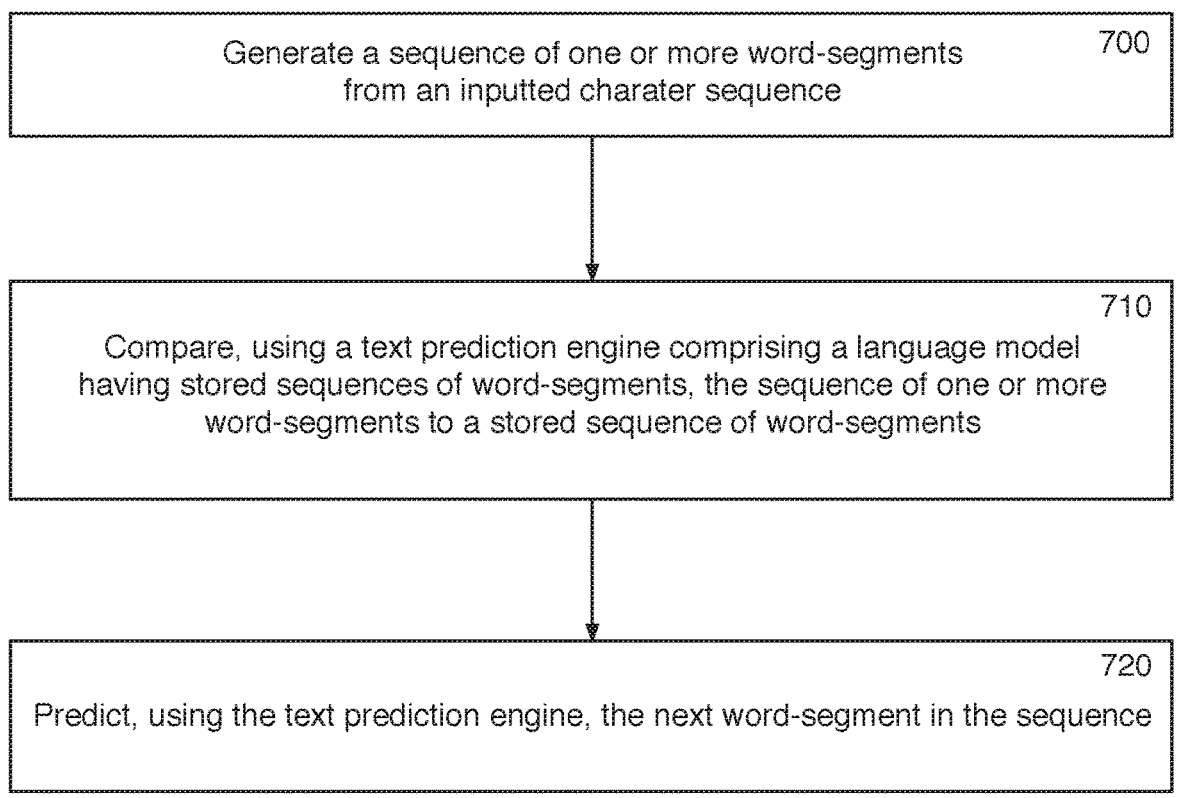
FIG. 7 is a flow chart of a second method of processing an electronic character sequence according to the invention.

FIG. 7 illustrates a second method of processing text according to the invention. The method relates to using a word-segment language model 10 to predict the next word-segment in a sequence of one or more word segments, as has been described above in relation to the language model illustrated in FIG. 2a and illustrated in the system of FIG. 1a. As with the first method, the second method comprises generating a sequence of one or more word-segments from the character sequence 700. However, the method comprises comparing the sequence of one or more word-segments to a stored sequence of word-segments 710, and predicting the next word-segment in the sequence based on the stored sequence 720.

Figure 8:
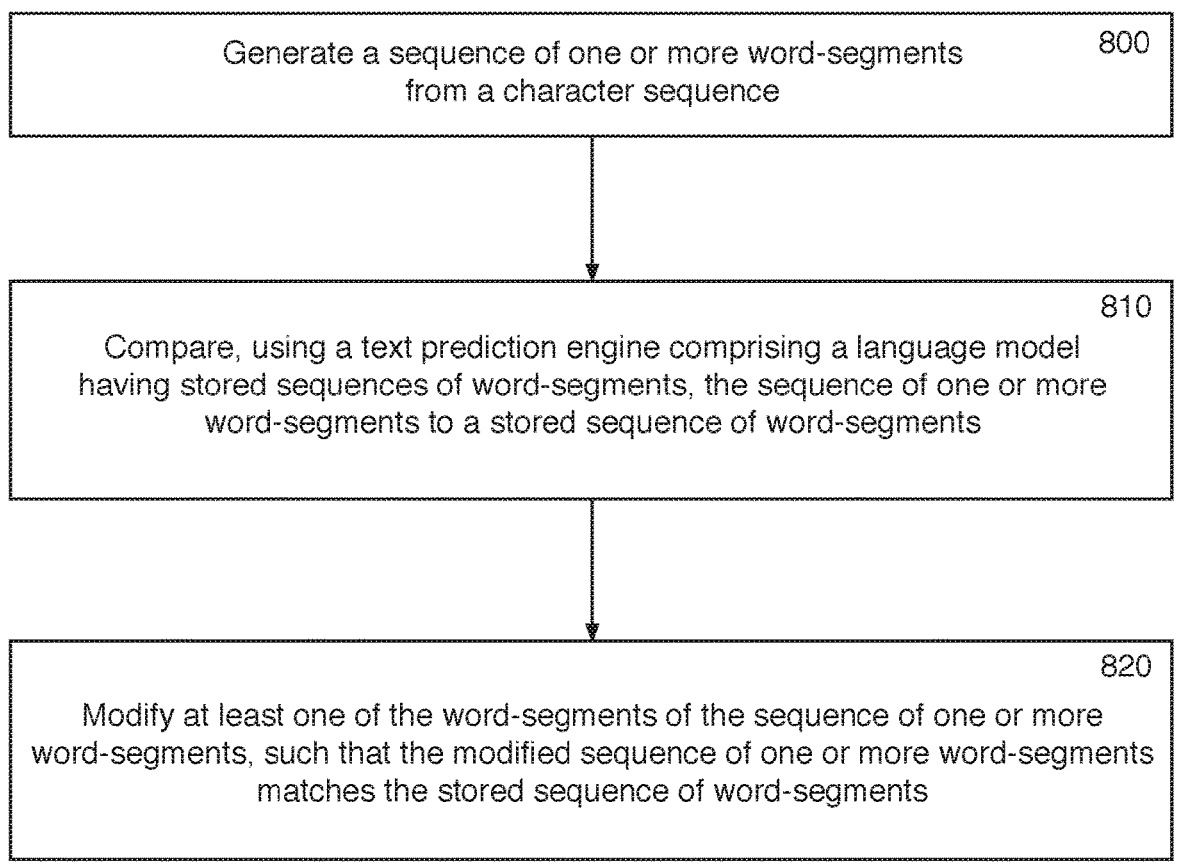
FIG. 8 is a flow chart of a third method of processing an electronic character sequence according to the invention.

FIG. 8 illustrates a third method of processing text according to the invention, which relates to predicting a modified or corrected word-segment of a sequence of one or more word-segments. The third method comprises the generating 800 and comparison 810 steps of the second method, but differs in that it comprises the step of modifying at least one of the word-segments of the sequence of one or more word-segments, such that the modified sequence of one or more word-segments matches the stored sequence of word-segments 820.

Figure 9:
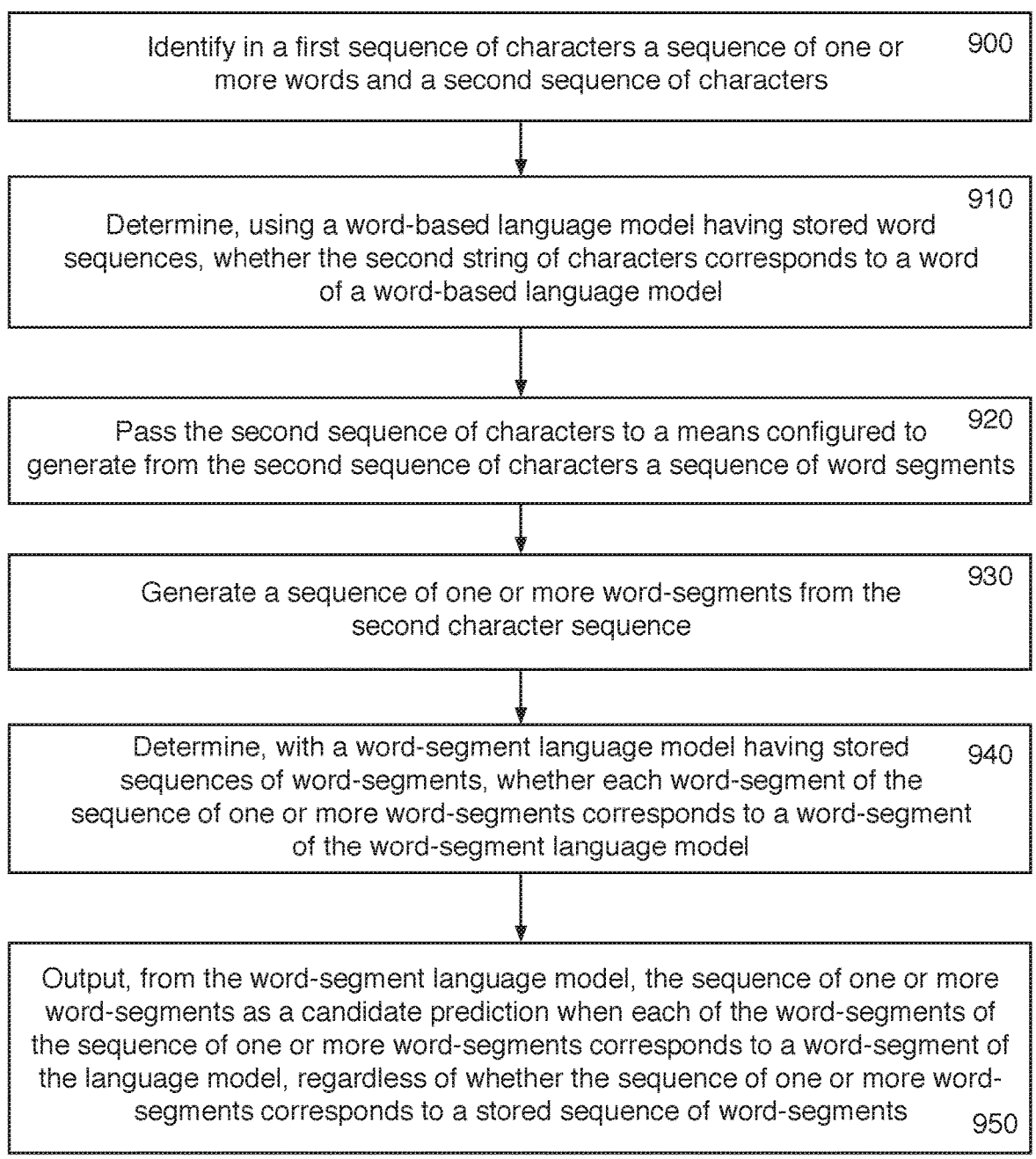
FIG. 9 is a flow chart of a fourth method of processing an electronic character sequence according to the invention.

As shown in FIG. 9, a fourth method of processing text according to the invention relates to the use of a word language model 20 to predict words 50' and the use of a word-segment language model 10 to validate verbatim input, for example if the probability of the word predicted by the word language model 20 falls below a threshold value, as discussed above in relation to the system of FIG. 2b. The method therefore comprises identifying in a first sequence of characters a sequence of one or more words and a second sequence of characters 900; determining, using a word-based language model having stored word sequences, whether the second string of characters corresponds to a word of the word-based language model 910; passing the second sequence of characters to a means configured to generate from the second sequence of characters a sequence of word segments 920; generating a sequence of one or more word-segments from the second character sequence 930; determining, with a word-segment language model having stored sequences of word-segments, whether each word-segment of the sequence of one or more word-segments corresponds to a word-segment of the language model 940; and outputting, from the word-segment language model, the sequence of one or more word-segments as a candidate prediction when each of the word-segments of the sequence of one or more word-segments corresponds to a word-segment of the word-segment language model, regardless of whether the sequence of one or more word-segments corresponds to a stored sequence of word-segments 950.

Figure 10:
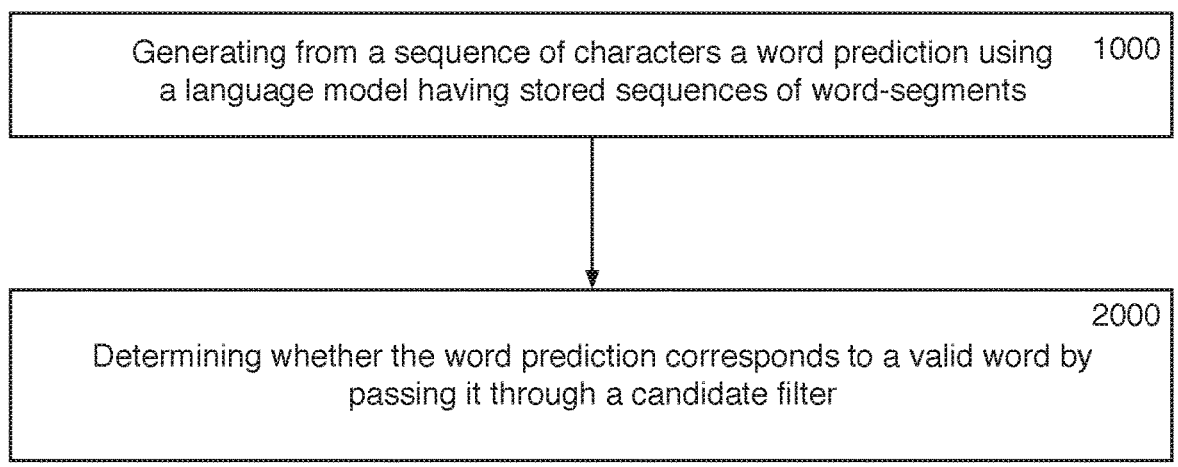
FIG. 10 is a flow chart of a fourth method of processing an electronic character sequence according to the invention.

As shown in FIG. 10, a fifth method for processing a sequence of characters comprises generating 1000 from the sequence of characters a word prediction using a language model having stored sequences of word-segments; and determining 2000 whether the word prediction corresponds to a valid word by passing it through a candidate filter. As described with respect to the systems of the invention, the candidate filter is preferably a bloom filter.

Other aspects of the methods of the present invention can be readily determined by analogy to the above system description The present invention also provides a computer program, or a computer program product comprising a computer readable medium having stored thereon computer program means, for causing a processor to carry out one or more of the methods according to the present invention.

The computer program product may be a data carrier having stored thereon computer program means for causing a processor external to the data carrier, i.e. a processor of an electronic device, to carry out the method according to the present invention. The computer program or computer program product may be available for download, for example from a data carrier or from a supplier over the internet or other available network, e.g. downloaded as an app onto a mobile device (such as a mobile phone) or downloaded onto a computer, the mobile device or computer comprising a processor for executing the computer program means once downloaded.

It will be appreciated that this description is by way of example only; alterations and modifications may be made to the described embodiment without departing from the scope of the invention as defined in the claims.

The invention claimed is:

1. A system for validating entered text comprising a processor and memory, the memory storing thereon machine-readable instructions that when executed by the processor, cause the system to:
   generate from a sequence of characters of the entered text, a sequence of word-segments;
   determine whether each word-segment of the sequence of word-segments corresponds to a respective stored word-segment of a hybrid language model, the hybrid language model including a word language model and a word-segment language model; and
   in response to determining that each word-segment of the sequence of word-segments corresponds to a respective stored word-segment of the hybrid language model, output the sequence of word-segments as a candidate prediction validating the entered text, wherein the sequence of word-segments is a single word that does not correspond to any stored words in the hybrid language model at a time of determining that each word-segment of the sequence of word-segments corresponds to a respective stored word-segment of the hybrid language model.

2. A method for processing text data by a computing device comprising a processor and memory, the method comprising:
   receiving data indicative of a sequence of characters of entered text;
   generating from the sequence of characters a sequence of one or more word-segments;
   comparing the sequence of one or more word-segments to a stored sequence of word segments;
   predicting, based on a hybrid language model, including a word language model and a word-segment language model, and a stored sequence of word-segments, a next word-segment in the sequence, wherein a single word is formed using the next word-segment in the sequence and the sequence of characters, and wherein the single word differs in at least one word-segment from all stored words in the hybrid language model at a time of predicting the next word-segment in the sequence and wherein each word-segment of the sequence and the next word-segment correspond to respective stored word-segments of the hybrid language model; and
   outputting the single word as a next word prediction.

3. The method of claim 2 further comprising iteratively predicting the next word-segment in the sequence.

4. The method of claim 3, further comprising:
iteratively predicting the next word-segment in the sequence until it has reached a term boundary; and
outputting the sequence of word-segments as a word.

5. The method of claim 4, further comprising sending the word through a candidate filter to determine if the word is a valid word.

6. The method of claim 5, further comprising:
discarding an invalid word unless it corresponds to verbatim text input; and
outputting valid words and invalid words corresponding to the verbatim text input.

7. The method of claim 5, where the hybrid language model comprises the candidate filter.

8. The method of claim 5, wherein the candidate filter is a bloom filter constructed from valid words.

9. The method of claim 8, wherein the bloom filter is constructed from character strings corresponding to the valid words or identifier combinations for the word-segment combinations making up the valid words.

10. A computing device comprising a processor and memory, the computing device configured to:
generate from a sequence of characters of entered text, a sequence of one or more word-segments;
compare the sequence of one or more word-segments to a stored sequence of word-segments;
modify, based on a hybrid language model, including a word language model and a word-segment language model, and the stored sequence of word-segments, at least one of the word-segments of the sequence of one or more word-segments such that the at least one modified word-segment corresponds to a stored word-segment in the hybrid language model, and wherein a single word is formed using the modified word-segment and unmodified word-segments of the sequence of one or more word-segments, and wherein the single word differs in at least one word-segment from all stored words in the hybrid language model at a time of modification to the at least one of the word-segments of the sequence and wherein each word-segment of the sequence corresponds to a respective stored word-segment of the hybrid language model; and
outputting the word as a candidate prediction.

11. The computing device of claim 10, wherein the hybrid language model comprises a plurality of word boundary markers which indicate the start or end of a word.

12. The computing device of claim 11, wherein the hybrid language model comprises a context model having stored sequences of word-segments and an input model having stored sequences of characters forming word-segments.

13. The computing device of claim 12, wherein the context model comprises an n-gram map having stored sequences of word segments.

14. The computing device of claim 13, wherein then-gram map comprises the plurality of word boundary markers which indicate the start or end of a word.

15. The computing device of claim 12, wherein the input model comprises a trie configured to generate one or more word-segments from a character sequence.

16. The computing device of claim 15, wherein the trie comprises a plurality of word-segment boundary markers.

17. The computing device of claim 15, further configured to determine whether each word-segment of the sequence of word-segments corresponds to a stored word-segment of the trie.

18. The computing device of claim 10, wherein the sequence of characters comprises the characters relating to the current word being entered and the characters relating to the context for that current word.

19. The computing device of claim 18, further configured to generate a sequence of one or more word-segments from the characters relating to the context.

20. The computing device of claim 18, further configured to generate a sequence of one or more word-segments from the characters relating to the current word.

* * * * *